US009578649B2

(12) United States Patent
Dayal et al.

(10) Patent No.: US 9,578,649 B2
(45) Date of Patent: Feb. 21, 2017

(54) METHOD AND APPARATUS TO FACILITATE SUPPORT FOR MULTI-RADIO COEXISTENCE

(75) Inventors: Pranav Dayal, San Diego, CA (US); Tamer Adel Kadous, San Diego, CA (US); Rajat Prakash, La Jolla, CA (US); Ashok Mantravadi, San Diego, CA (US); Ahmed K. Sadek, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 892 days.

(21) Appl. No.: 13/351,739

(22) Filed: Jan. 17, 2012

(65) Prior Publication Data
US 2012/0188907 A1 Jul. 26, 2012

Related U.S. Application Data

(60) Provisional application No. 61/434,827, filed on Jan. 20, 2011, provisional application No. 61/442,580, (Continued)

(51) Int. Cl.
*H04L 12/28* (2006.01)
*H04W 72/12* (2009.01)
*H04W 88/06* (2009.01)

(52) U.S. Cl.
CPC ......... *H04W 72/1215* (2013.01); *H04W 88/06* (2013.01)

(58) Field of Classification Search
CPC .................. H04W 72/1215; H04W 88/06
See application file for complete search history.

(56) References Cited

U.S. PATENT DOCUMENTS 7,649,869 B2   1/2010   Mittal et al.
8,346,171 B1   1/2013   Mack
(Continued)

FOREIGN PATENT DOCUMENTS

JP   2011512104 A   4/2011
KR   20100004766 A   1/2010
(Continued)

OTHER PUBLICATIONS

3rd Generation Partnership Project; Technical Specification Group Radio Access Networks; Evolved Universal Terrestrial Radio Access (E-UTRA) ; Study on signaling and procedure for interference avoidance for in-device coexistence; (Release 10), 3GPP Standard; 3GPP TR 36.816, 3RD Generation Partnership Project (3GPP), Mobile Competence Centre ; 650, Route Des Lucioles ; F-06921 Sophia-Antipolis Cedex ; France, No. v1.0.0, Dec. 17, 2010 (Dec. 17, 2010), pp. 1-34, XP050462125, [retrieved on Dec. 17, 2010].
(Continued)

*Primary Examiner* — Ayaz Sheikh
*Assistant Examiner* — Hai-Chang Hsiung
(74) *Attorney, Agent, or Firm* — Seyfarth Shaw LLP

(57) ABSTRACT

To improve performance in devices capable of communication using multiple radio access technologies (RATs), a gap pattern may be constructed in which a first RAT is quieted during certain times to allow for a second RAT to operate without interference. Gap patterns may be constructed based on timeline constraints, such as grant scheduling and HARQ performance, or based on desired performance levels of one or more of the RATs. Gap patterns may be selected by a user equipment or base station. Gap patterns may be selected to protect information in certain subframes. Potential gap patterns may be assigned weights indicating their desirability.

38 Claims, 23 Drawing Sheets

Related U.S. Application Data filed on Feb. 14, 2011, provisional application No. 61/442,743, filed on Feb. 14, 2011, provisional application No. 61/471,654, filed on Apr. 4, 2011, provisional application No. 61/505,417, filed on Jul. 7, 2011, provisional application No. 61/553,122, filed on Oct. 28, 2011.

(56) References Cited

U.S. PATENT DOCUMENTS

| | | | |
|---|---|---|---|
| 8,351,456 | B2 | 1/2013 | Kadous et al. |
| 2004/0210619 | A1* | 10/2004 | Balachandran et al. ...... 709/200 |
| 2006/0039450 | A1 | 2/2006 | Fulton et al. |
| 2007/0037601 | A1* | 2/2007 | Mittal et al. .................. 455/525 |
| 2007/0275746 | A1 | 11/2007 | Bitran |
| 2007/0280368 | A1* | 12/2007 | Jonsson ........................ 375/262 |
| 2008/0189970 | A1 | 8/2008 | Wang et al. |
| 2008/0205365 | A1 | 8/2008 | Russell et al. |
| 2008/0227488 | A1 | 9/2008 | Zhu et al. |
| 2009/0129367 | A1 | 5/2009 | Bitran |
| 2009/0257379 | A1 | 10/2009 | Robinson et al. |
| 2010/0061326 | A1 | 3/2010 | Lee et al. |
| 2010/0172254 | A1 | 7/2010 | Sachs |
| 2010/0197235 | A1 | 8/2010 | Wilhelmsson |
| 2010/0197316 | A1 | 8/2010 | Aoyama et al. |
| 2010/0202429 | A1 | 8/2010 | Chin et al. |
| 2010/0246463 | A1 | 9/2010 | Papasakellariou et al. |
| 2010/0297962 | A1* | 11/2010 | Rofougaran ............. H04B 1/18 455/88 |
| 2010/0322287 | A1 | 12/2010 | Truong et al. |
| 2011/0009136 | A1 | 1/2011 | Mantravadi et al. |
| 2011/0243047 | A1 | 10/2011 | Dayal et al. |
| 2011/0268048 | A1 | 11/2011 | Toskala et al. |
| 2012/0020229 | A1 | 1/2012 | Dayal et al. |
| 2012/0040715 | A1 | 2/2012 | Fu et al. |
| 2012/0093009 | A1 | 4/2012 | Wang et al. |
| 2012/0164948 | A1 | 6/2012 | Narasimha et al. |
| 2012/0213116 | A1 | 8/2012 | Koo et al. |
| 2013/0010766 | A1 | 1/2013 | Sadek et al. |
| 2013/0021983 | A1 | 1/2013 | Sadek et al. |
| 2013/0242780 | A1 | 9/2013 | Dayal et al. |

FOREIGN PATENT DOCUMENTS

| | | |
|---|---|---|
| WO | 2004045092 A1 | 5/2004 |
| WO | 2009137295 A2 | 11/2009 |
| WO | 2011002795 A1 | 1/2011 |

OTHER PUBLICATIONS

Intel Corporation (UK) LTD: "General analysis of TDM solutions for coexistence", 3GPP Draft; R2-106583, 3RD Generation Partnership Project (3GPP), Mobile Competence Centre ; 650, Route Des Lucioles ; F-06921 Sophia-Anti Polis Cedex ; France, vol. RAN WG2, No. Jacksonville, USA; 20101115, Nov. 9, 2010 (Nov. 10, 2010), XP050492356, [retrieved on Nov. 9, 2010].

Intel Corporation (UK) Ltd: "Timeline analysis of TDM solutions for coexistence with WiFi", 3GPP Draft; R2-106584, 3RD Generation Partnership Project (3GPP) , Mobile Competence Centre ; 650, Route Des Lucioles ; F-06921 Sophia-Anti Polis Cedex ; France, vol. RAN WG2, No. Jacksonville, USA; 20101115, Nov. 9, 2010 (Nov. 9, 2010), XP050492357, [retrieved on Nov. 9, 2010].

Mediatek: "Analysis in Potential TDM Coexistence Solutions", 3GPP Draft; R2-105449 Potential TDM Solutions, 3RD Generation Partnership Project (3GPP), Mobile Competence Centre ; 650, Route Des Lucioles ; F-06921 Sophia-Antipolis Cedex ; France, vol. RAN WG2, No. Xi'an; 20101011, Oct. 5, 2010 (Oct. 5, 2010), XP050452605, [retrieved on Oct. 5, 2010].

Motorola: "Discussion on TDM approach for In-device coexistence", 3GPP Draft; R2-106476, 3RD Generation Partnership Project (3GPP), Mobile Competence Centre ; 650, Route Des Lucioles ; F-06921 Sophia-Antipolis Cedex ; France, vol. RAN WG2, No. Jacksonville, USA; 20101115, Nov. 9, 2010 (Nov. 9, 2010), XP050492293, [retrieved on Nov. 9, 2010].

Qualcomm, "Short term TDM solutions for LTE and Bluetooth voice coexistence," R2-105783, 3GPP TSG-RAN WG2 Meeting #71-BIS, Xi'an, China, Oct. 11-15, 2010, 4 pages.

3GPP: "3rd Generation Partnership Project; Technical Specification Group Radio Access Networks; Evolved Universal Terrestrial Radio Access (E-UTRA); Study on signaling and procedure for interference avoidance for in-device coexistence; (Release 10)", 3GPP Draft; R2-106971_TR36816_V100, 3rd Generation Partnership Project (3GPP), Mobile Competence Centre ; 650 Route Des Lucioles; F-06921 Sophia-Anti Polts Cedex ; France vol. Ran WG2, No. Jacksonville, USA; 20101115, Dec. 1, 2e10 (Dec. 1, 2010).

Intel Corporation (UK) Ltd: "TDM Solutions for In-Device Coexistence", 3GPP Draft; R2-105666, 3rd Generation Partnership Project (3GPP), Mobile Competence Centre ; 650, Route Des Lucioles ; F-06921 Sophia-Antipolis Cedex ; France, vol. RAN WG2, No. Xi'an; 20101011, Oct. 5, 2010 (Oct. 5, 2010), XP050452677, [retrieved on Oct. 5, 2010] *chapter 2, "TDM Solutions"*.

Intel Corporation (UK) Ltd: "Time line analysis of TDM solutions for coexistence with Bluetooth", 3GPP Draft; R2-106585, 3rd Generation Partnership Project (3GPP), Mobile Competence Centre ; 650, Route Des Lucioles ; F-06921 Sophia-Antipolis Cedex ; France, vol. RAN WG2, No. Jacksonville, USA; 20101115, Nov. 9, 2010 (Nov. 9, 2010), XP050492358, [retrieved on Nov. 9, 2010] *chapter 3, "Results and Analysis"** Annex C*.

Intel: "General analysis of TDM solutions for coexistence", 3GPP Draft; R2-110229, 3rd Generation Partnership Project (3GPP), Mobile Competence Centre ; 650, Route Des Lucioles ; F-06921 Sophia-Antipolis Cedex ; France, vol. Ran WG2, No. Dublin, Ireland; 20110117, Jan. 11, 2011 (Jan. 1, 2011), XP050492938, [retrieved on 2011-01-11] *chapter 3, "Reporting"*.

International Search Report and Written Opinion—PCT/US2012/021685, ISA/EPO—May 10, 2012.

Qualcomm: "Short term TDM solutions for LTE and Bluetooth voice coexistence", 3GPP Draft; R2-106006 Short Term TDM FORCX, 3rd Generation Partnership Project (3GPP), Mobile Competence Centre; 650, Route Des Lucioles ; F-06921 Sophia-Antipolis Cedex ; France, vol. RAN WG2, No. Xia an, China; 201010, Oct. 15, 2010 (Oct. 15, 2010), XP050491851, [retrieved on Oct. 15, 2010] *chapter 2, "LTE BT eSCO Timelines"* *chapter 3, "LTE-BT eSCO Time Sharing"*.

Samsung: "Possible TDM Solution for LTE, WiFi and BT In-device Coexistence", 3GPP Draft; R2-105572, 3rd Generation Partnership Project (3GPP), Mobile Competence Centre ; 650, Route Des Lucioles ; F-06921 Sophia-Antipolis Cedex ; France, vol. RAN WG2, No. Xi 'an; 20101011, Oct. 5, 2010 (Oct. 5, 2010), XP050452632, [retrieved on Oct. 5, 2010].

* cited by examiner

METHOD AND APPARATUS TO FACILITATE SUPPORT FOR MULTI-RADIO COEXISTENCE

CROSS REFERENCE TO RELATED APPLICATION

This application claims the benefit of U.S. Provisional Patent Application No. 61/434,827 filed Jan. 20, 2011, in the names of SADEK et al.; U.S. Provisional Patent Application No. 61/442,580 filed Feb. 14, 2011, in the names of SADEK et al.; U.S. Provisional Patent Application No. 61/442,743 filed Feb. 14, 2011, in the names of SADEK et al.; U.S. Provisional Patent Application No. 61/471,654 filed Apr. 4, 2011, in the names of DAYAL et al.; U.S. Provisional Patent Application No. 61/505,417 filed Jul. 7, 2011, in the names of DAYAL et al.; and U.S. Provisional Patent Application No. 61/553,122 filed Oct. 28, 2011, in the names of DAYAL et al., the disclosures of which are expressly incorporated herein by reference in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNodeB; e.g., a base station for a wireless communications network) to inform the eNodeB of interference seen by the UE on the downlink. Furthermore, the eNodeB may be able to estimate interference at the UE using a downlink error rate. In some instances, the eNodeB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNodeB. As a result, unilateral action on the part of the UE (e.g., moving the uplink signal to a different channel) may be thwarted by the eNodeB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNodeB. Hence, a ping-pong effect of being transferred back and forth between the corrupted channel and the desired channel can happen if the eNodeB uses RSRP reports to make handover decisions.

Other unilateral action on the part of the UE, such as simply stopping uplink communications without coordination of the eNodeB may cause power loop malfunctions at the eNodeB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

Offered is a method for wireless communications. The method includes determining a potential gap pattern configuration(s) for a first radio access technology (RAT). The gap pattern configuration(s) meets a scheduling timeline constraint(s) of the first RAT. The method also includes selecting a potential gap pattern configuration(s) that reduces conflicts between the first RAT and a second RAT.

Offered is an apparatus for wireless communications. The apparatus includes means for determining a potential gap pattern configuration(s) for a first radio access technology (RAT). The gap pattern configuration(s) meets a scheduling timeline constraint(s) of the first RAT. The apparatus also includes means for selecting a potential gap pattern configuration(s) that reduces conflicts between the first RAT and a second RAT.

Offered is a computer program product for wireless communications. The computer program product includes a non-transitory computer-readable medium having program code recorded thereon. The program code includes program code to determine a potential gap pattern configuration(s) for a first radio access technology (RAT). The gap pattern configuration(s) meets a scheduling timeline constraint(s) of the first RAT. The program code also includes program code to select a potential gap pattern configuration(s) that reduces conflicts between the first RAT and a second RAT.

Offered is an apparatus for wireless communications. The apparatus includes a memory and a processor(s) coupled to the memory. The processor(s) is configured to determine a potential gap pattern configuration(s) for a first radio access technology (RAT). The gap pattern configuration(s) meets a scheduling timeline constraint(s) of the first RAT. The processor(s) is also configured to select a potential gap pattern configuration(s) that reduces conflicts between the first RAT and a second RAT.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
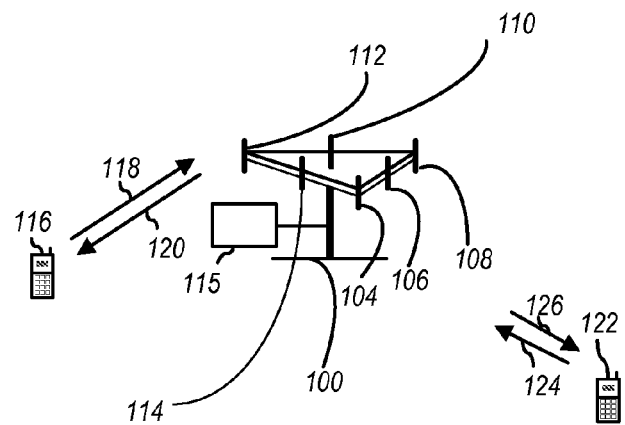
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNodeB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNodeB while reestablishing connection in the new channel or RAT. The eNodeB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnerhip Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNodeB) includes a computer 115 that has processing resources and memory resources to manage the LTE communications by allocating resources and parameters, granting/denying requests from user equipment, and/or the like. The eNodeB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNodeB. In this aspect, respective antenna groups are designed to communicate to UEs in a sector of the areas covered by the eNodeB 100.

In communication over the downlinks 120 and 126, the transmitting antennas of the eNodeB 100 utilize beamforming to improve the signal-to-noise ratio of the uplinks for the different UEs 116 and 122. Also, an eNodeB using beamforming to transmit to UEs scattered randomly through its coverage causes less interference to UEs in neighboring cells than a UE transmitting through a single antenna to all its UEs.

An eNodeB can be a fixed station used for communicating with the terminals and can also be referred to as an access point, base station, or some other terminology. A UE can also be called an access terminal, a wireless communication device, terminal, or some other terminology.

Figure 2:
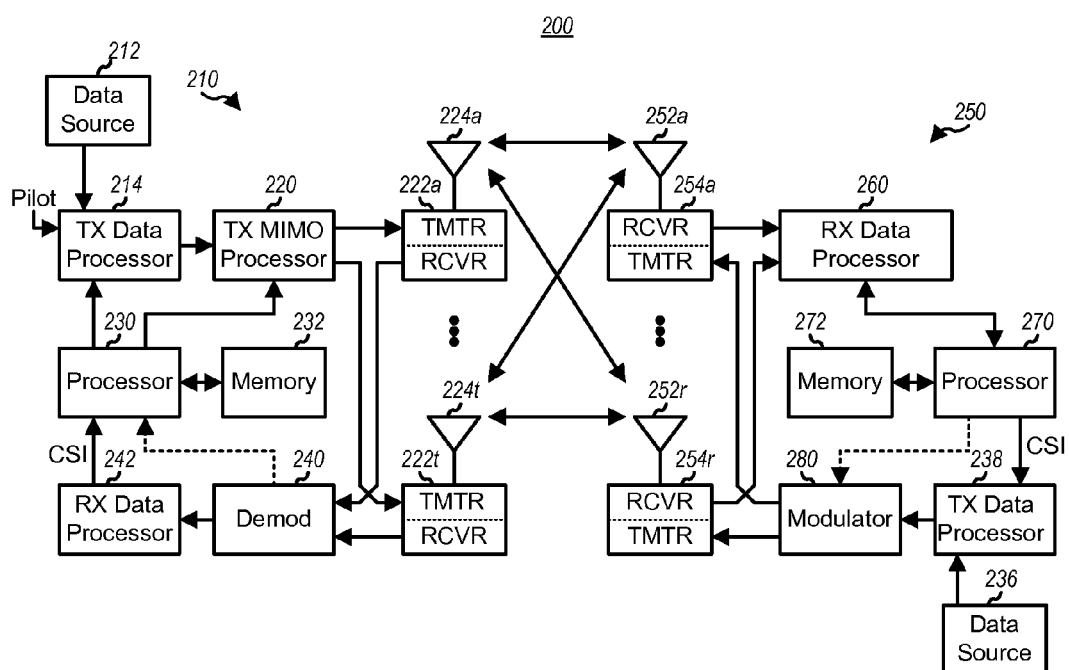
FIG. 2 is a block diagram of a communication system according to one aspect.

FIG. 2 is a block diagram of an aspect of a transmitter system 210 (also known as an eNodeB) and a receiver system 250 (also known as a UE) in a MIMO system 200. In some instances, both a UE and an eNodeB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNodeB to extract transmit beamforming gain on the downlink when multiple antennas are available at the eNodeB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response.

The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
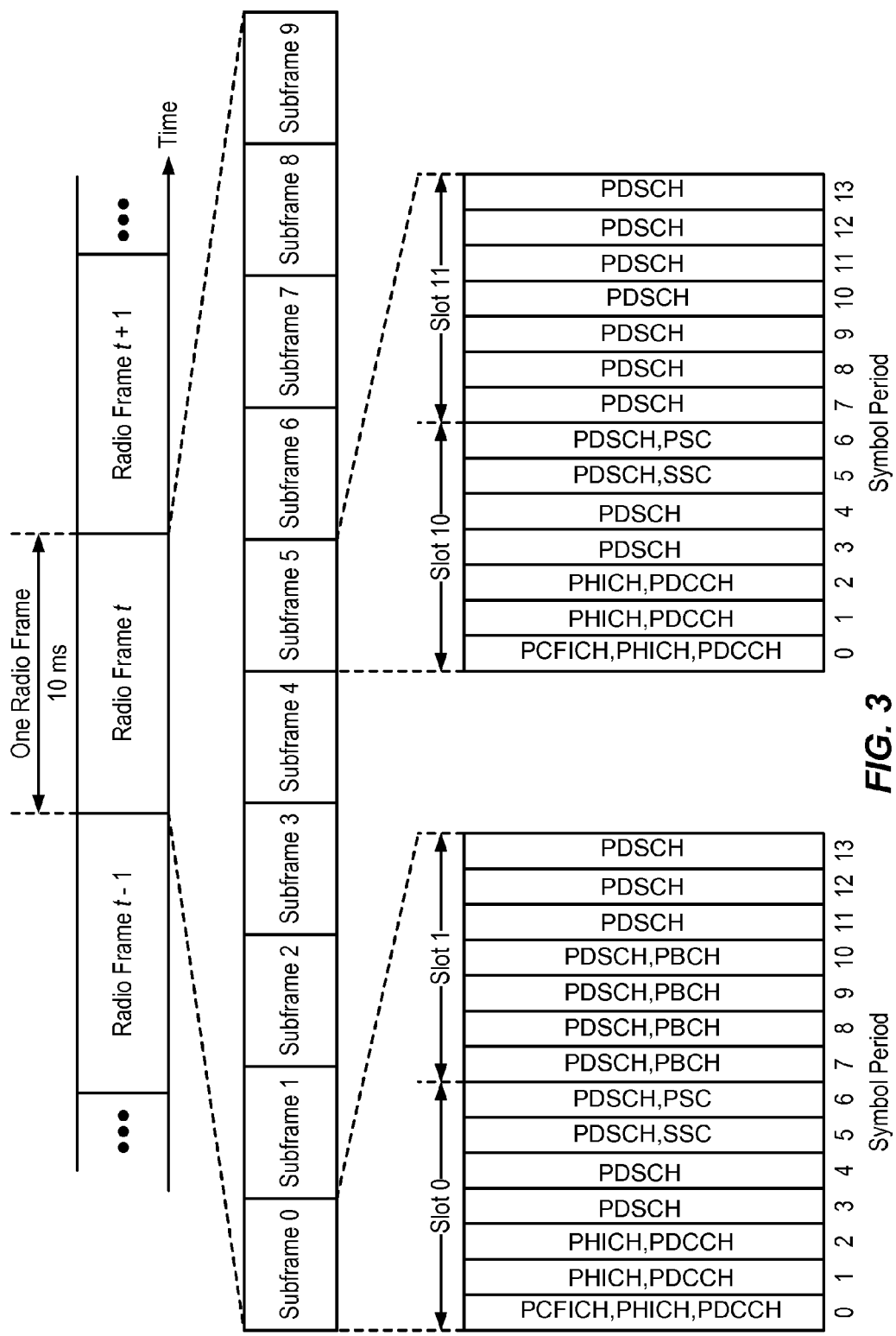
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a Primary Synchronization Signal (PSS) and a Secondary Synchronization Signal (SSS) for each cell in the eNodeB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Cell-specific Reference Signal (CRS) for each cell in the eNodeB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNodeB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

Figure 4:
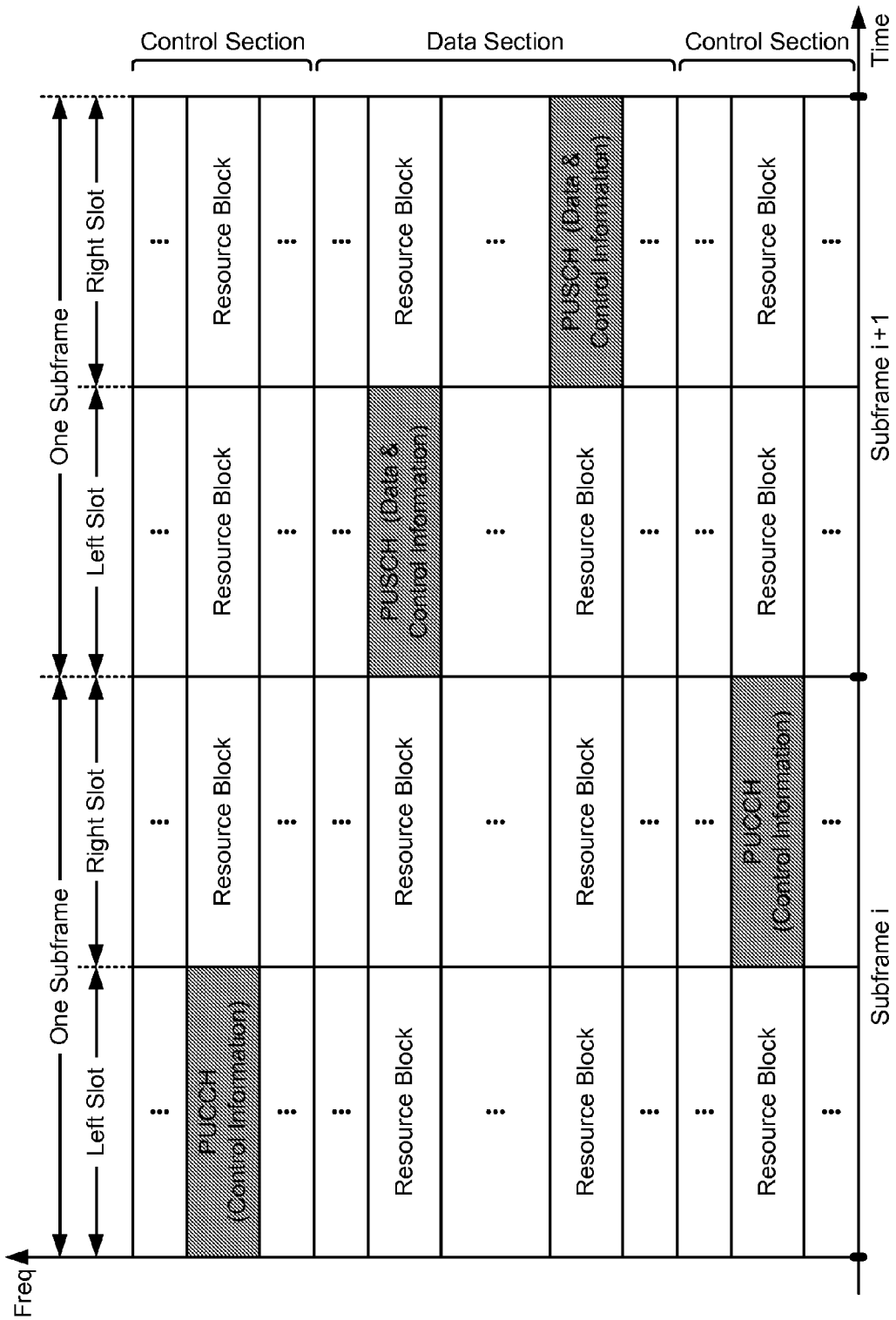
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
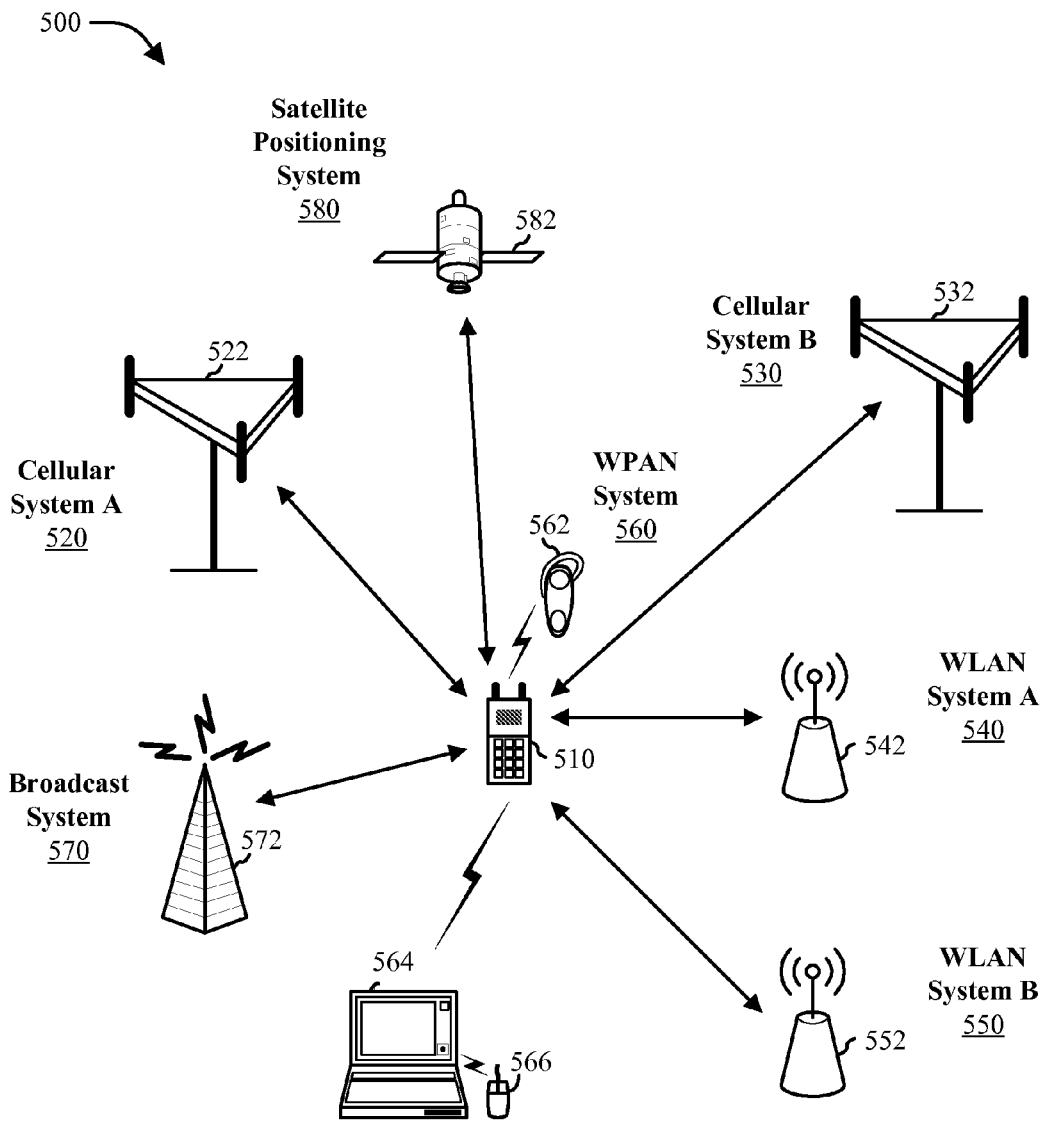
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL)

station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
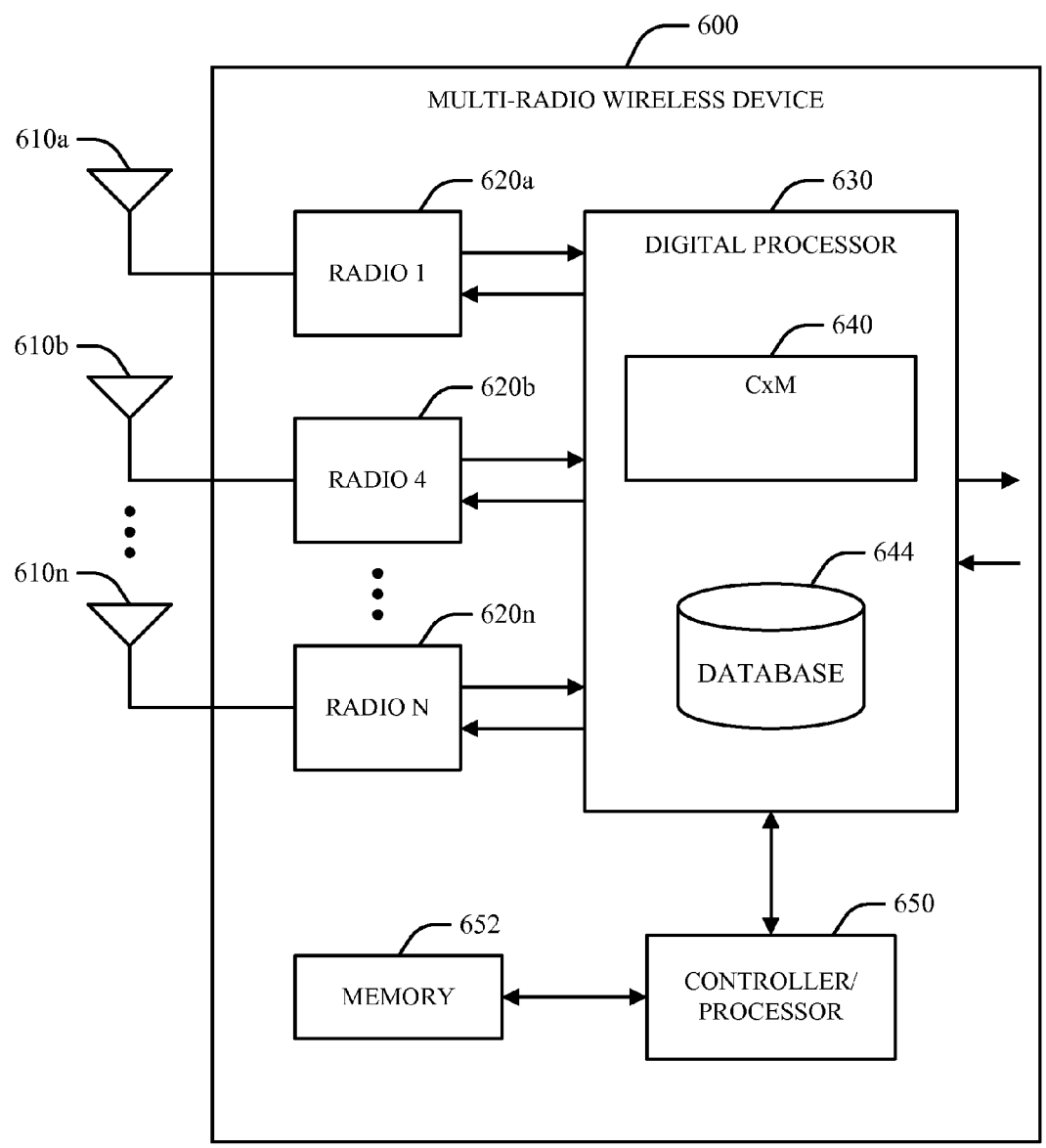
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager (CxM) 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
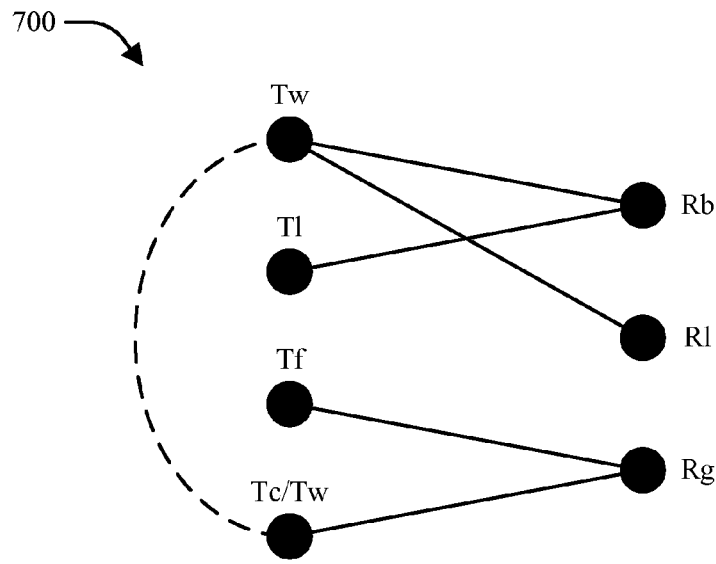
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as those illustrated in FIG. 22. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
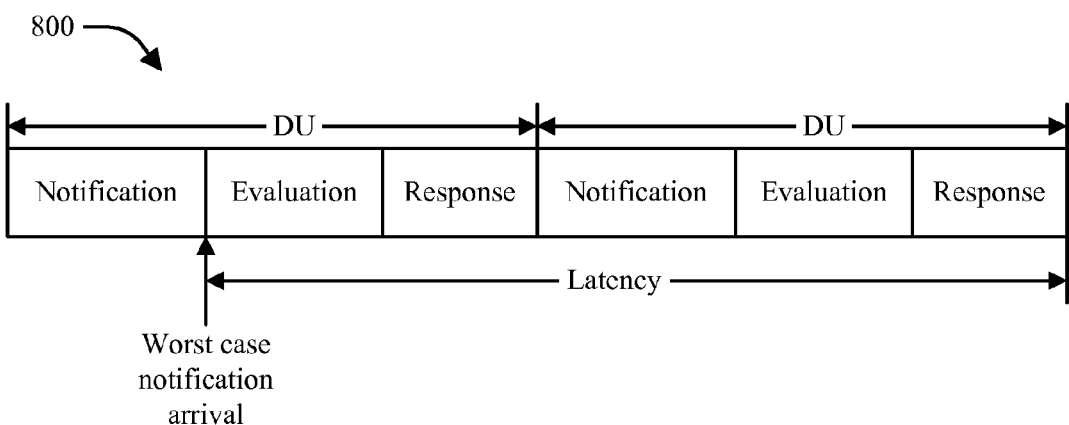
FIG. 8 is a diagram showing operation of an example coexistence manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
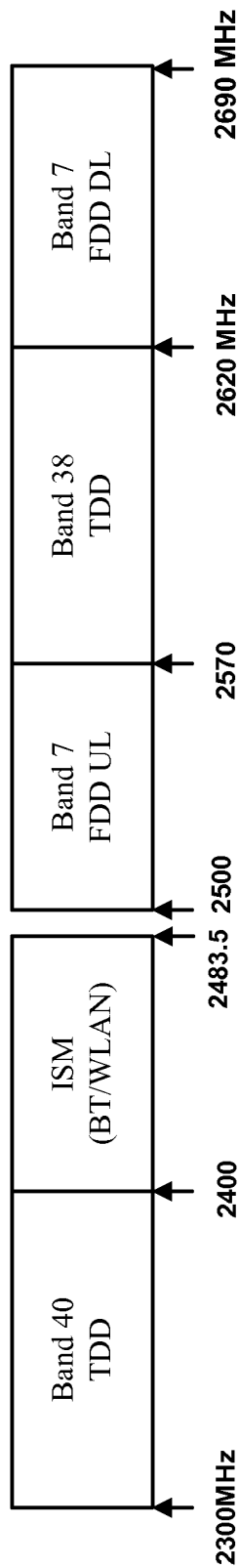
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7

(2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNodeB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNodeB can in some cases handover the UE back to the problematic channel for load balancing purposes. In any case, it can be appreciated that existing techniques do not facilitate use of the bandwidth of the problematic channel in the most efficient way.

Figure 10:
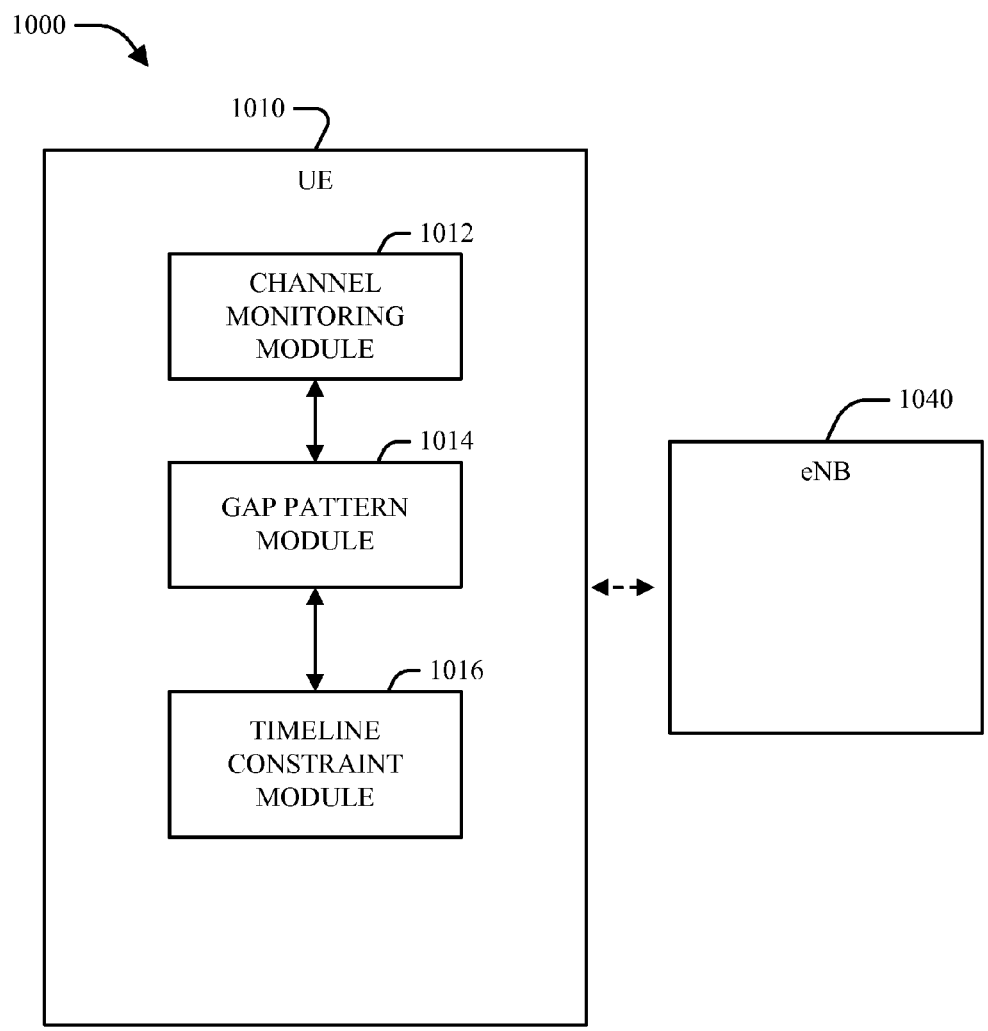
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNodeBs 1040, which can engage in uplink and/or downlink communications, and/or any other suitable communication with each other and/or any other entities in the system 1000. In one example, the UE 1010 and/or eNodeB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. For example, a channel monitoring module 1012, a gap pattern module 1014, and a timeline constraint module 1016 may be implemented. The channel monitoring module 1012 monitors the performance of communication channels for potential interference issues. The gap pattern module 1014 may determine potential gap patterns to be applied to one or more radio access technologies (RATs) in a device. The timeline constraint module 1016 may determine how timeline constraints such as grant scheduling or signal acknowledgement may interact with potential gap patterns using the methods described below. The various modules 1012-1016 may, in some examples, be implemented as part of a coexistence manager such as the CxM 640 of FIG. 6. The various modules 1012-1016 and others may be configured to implement the embodiments discussed herein.

Gap Pattern Selection to Improve Coexistence

In a mobile communications user equipment (UE) there may be interference issues between a Long Term Evolution (LTE) radio (particularly in Band 40 (2.3-2.4 GHz) and Band 7 (2.5 GHz)) and a radio used for industrial, scientific and medical (ISM) band communications (in particular Bluetooth and wireless local area network (WLAN)). The interference is further complicated because LTE and Bluetooth (BT) are asynchronous with respect to each other. One 5 millisecond (ms) LTE frame includes a receive/downlink (DL) subframe 3 ms long and a transmit/uplink (UL) subframe 2 ms long. In 5 ms, Bluetooth has 8 time slots, each slot 625 microseconds (µs) long, and alternating between receive/downlink (DL) and transmit/uplink (UL).

Figure 11:
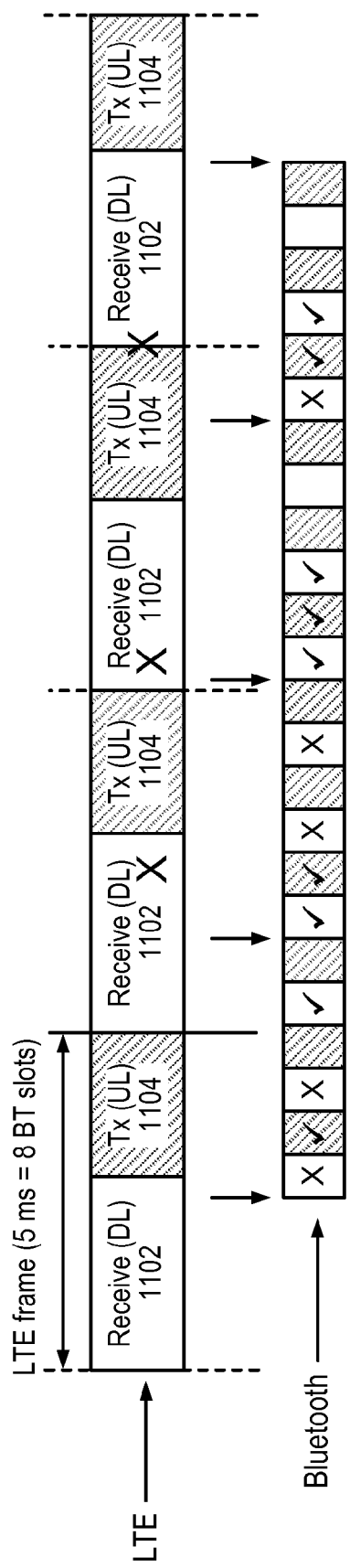
FIG. 11 illustrates interference on a timeline for LTE Band 40 communications and Bluetooth communications with no coexistence manager.

If one radio is transmitting while the other is trying to receive, there will be interference on the receive side. For example, FIG. 11 illustrates interference on a timeline for LTE Band 40 (TDD LTE (time division duplex LTE) Configuration 1) and Bluetooth with no coexistence manager. As shown, each LTE frame is 10 milliseconds long with two 5 millisecond half frames. A 5 ms half frame is illustrated, with three one ms timeslots of downlink receive (shown grouped as receive downlink (DL) timeslots 1102) and two one ms timeslots of uplink transmit (shown grouped as transmit (Tx) uplink (UL) timeslots 1104). As illustrated, each Bluetooth enhanced synchronous connection oriented (eSCO) interval (between the vertical arrows) consists of six timeslots (each 625 microseconds long) beginning with a receive slot and alternating between receive and transmit (transmit indicated with shading). As result of the length of LTE half frames (5 ms) and Bluetooth intervals (3.75 ms), the pattern of eSCO offset relative to LTE will repeat every 15 ms (or every three LTE half frames).

In the illustration, Bluetooth is configured to be in slave mode. Other eSCO configurations and Bluetooth traffic types are possible and may be used with the present disclosure.

For purposes of FIG. 11, LTE is assumed to be always operating. In each timeslot a check mark (✓) indicates when Bluetooth is successfully operating. An X indicates interference. An overlap between one radio's active transmit time slot (shown in FIG. 11 as shaded time slots) with the other's receive time slot (shown in FIG. 11 as unshaded time slots) will result in an interfered with timeslot, indicated with an X. As illustrated, one active LTE transmit/receive timeslot may interfere with multiple Bluetooth receive/transmit timeslots. As may be seen in FIG. 11, there may be some overlap between the end of a Bluetooth transmit timeslot and the beginning of an LTE receive timeslot. In some of these situations Bluetooth may still be able to transmit effectively, even if the end of its transmit timeslot is cutoff because data in a Bluetooth timeslot may only be transmitted in the first 450 µs, and the remaining 175 µs may be a gap period. Thus a potential successful Bluetooth transmission occurs even if the end of a transmit timeslot is cut off.

Because the time slots of the two radios are not synchronized, frequent and unpredictable interference may occur. The time period between the beginning of an LTE subframe and a Bluetooth eSCO interval is referred to as an offset. Each specific interference pattern will depend on the offset between LTE and Bluetooth.

In one aspect, the UE may assume that the minimum acceptable performance for enhanced synchronous connection oriented (eSCO) is that of synchronous connection oriented (SCO) communications. While, this may not be the case, the assumption will give a lower bound on LTE throughput degradation, thus reducing LTE degradation while ensuring that Bluetooth is allowed at least one transmit and one receive slot in each eSCO interval. With each eSCO interval having six timeslots and two re-transmissions, there are five ways for eSCO to succeed with only one Tx and one Rx slot (where 'X' denotes a slot that is not used or denied, R and T denote receive and transmit for the Bluetooth Slave):

RTXXXX
XXRTXX
XXXXRT
XTRXXX
XTXXRX

The above configuration applies due to certain polling rules. The first two timeslots are reserved and permit transmission but otherwise the transmit timeslot immediately follows a receive timeslot while Bluetooth is in slave mode.

One method to reduce or minimize coexistence interference is to allow time division multiplexing (TDM) arbitration schemes between LTE and Bluetooth operation to avoid mutual interference while enabling Bluetooth eSCO operation and reducing throughput impact to LTE.

Figure 12:
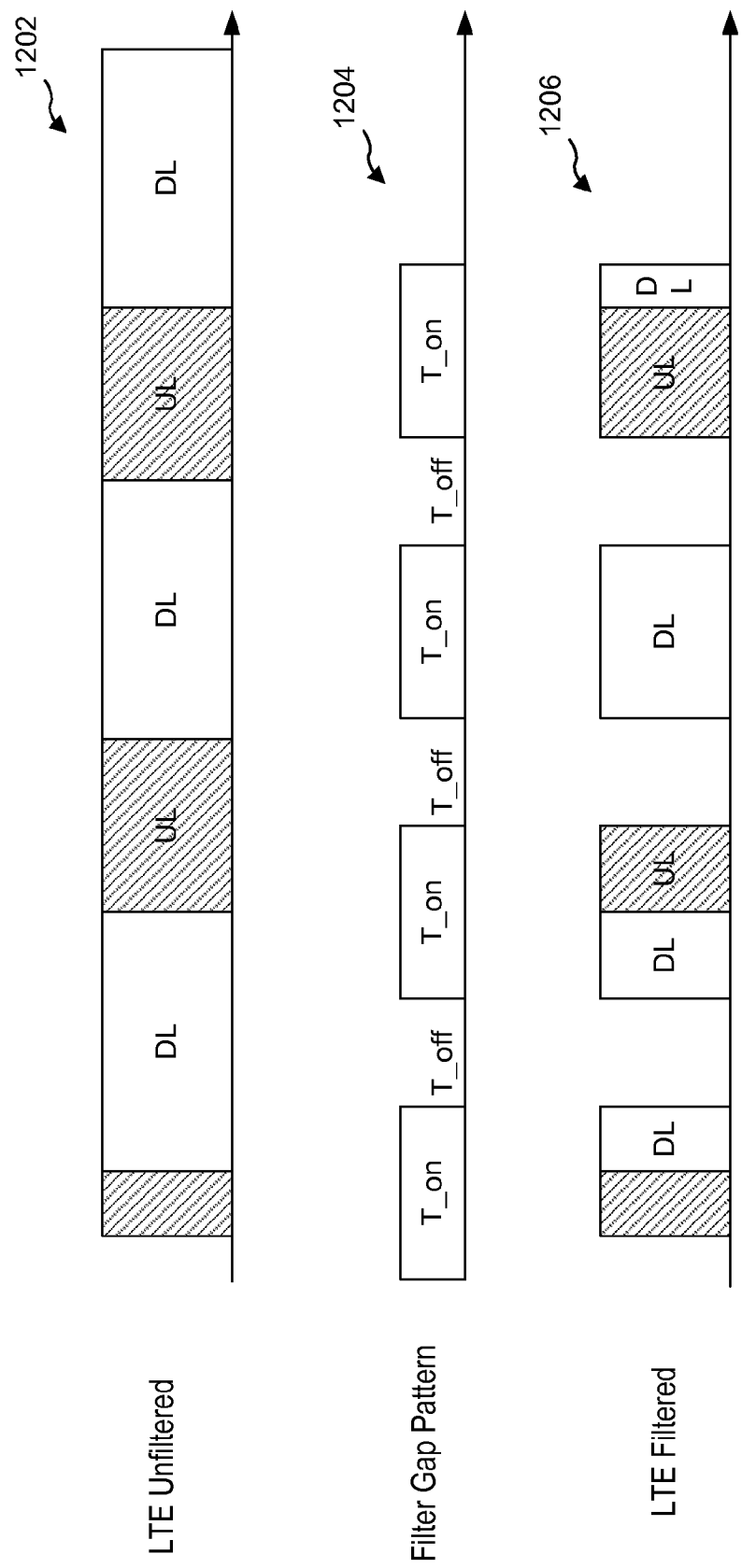
FIG. 12 illustrates LTE filtering according to one aspect of the present disclosure.

One TDM option is to allow a fixed on-off pattern for LTE as shown in FIG. 12. An unfiltered LTE transmission scheme is shown in diagram 1202, with a receive/downlink (DL) subframe 3 ms long and a transmit/uplink (UL) subframe 2 ms long. Diagram 1204 shows a filter which may be applied to the LTE transmission allowing LTE activity only during certain time periods, called T_on, and turning LTE activity off during other periods, called T_off. The effective filtered LTE activity is then shown in diagram 1206, which shows LTE activity only occurring during periods coinciding with T_on. A Bluetooth radio may then utilize the T_off periods for activity without interference from LTE.

In another aspect, LTE may opportunistically utilize the T_off period when LTE would not cause interference to Bluetooth or Bluetooth is not utilizing its allocated time. Similarly, Bluetooth may opportunistically utilize the T_on period when it would not cause interference to LTE or when LTE is not utilizing its allocated time.

In another aspect, the timing and length of the T_on and T_off periods may be selected to improve or optimize LTE and Bluetooth performance or to meet certain quality of service requirements. One example is T_on and T_off equal to 2 ms. This length allows Bluetooth eSCO patterns to achieve certain minimal levels of operability. One drawback to the scheme of 2 ms for T_on and 2 ms for T_off is that it shuts down LTE operation 50% of the time. This may result in an undesired throughput loss to LTE operation.

Figure 13:
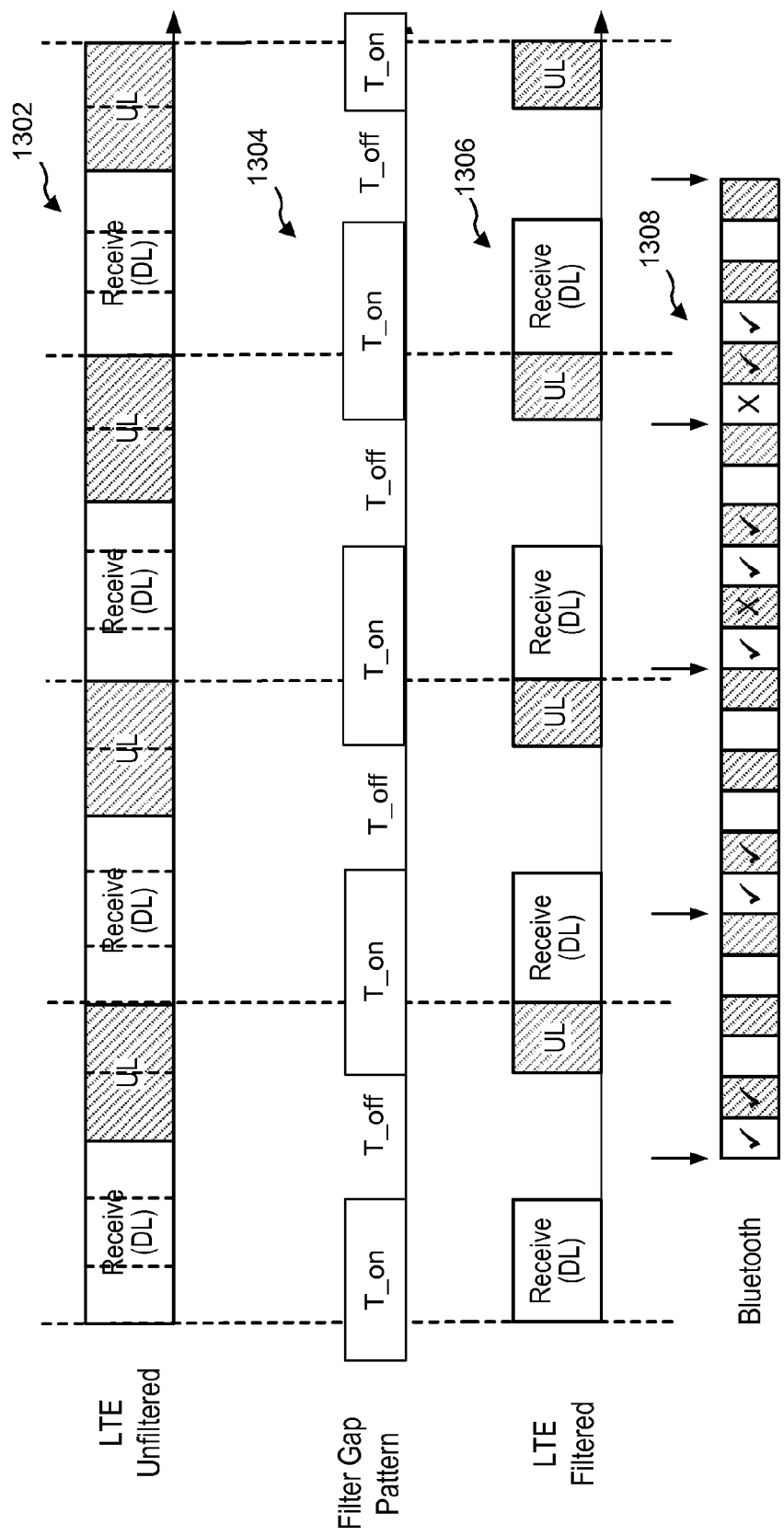
FIG. 13 illustrates LTE filtering according to one aspect of the present disclosure.

In one aspect, the timing of the T_on and T_off gap pattern may be configured to align with the LTE TDD pattern. FIG. 13 shows a specific gap pattern for the LTE TDD configuration, DDDUU, where D denotes a downlink subframe of 1 ms and U denotes uplink subframe of 1 ms. Diagram 1302 shows an unfiltered LTE signal using the DDDUU pattern, with 3 ms of downlink (DL) followed by 2 ms of uplink (DL). The demarcations between subframes in diagram 1302 are indicated by dashed lines. (Note: the subframes are not shown exactly to scale.) FIG. 13 also shows a Bluetooth eSCO pattern 1308 with 6 time slots. In the gap pattern depicted in diagram 1304, the third LTE downlink subframe and the first LTE uplink frame (diagram 1306) are used to create a gap for BT to utilize. Such a gap pattern will create a 2 ms gap in LTE operation every 5 ms. Bluetooth may then operate in that gap. Such a gap pattern will allow any eSCO pattern with any phase offset from LTE frame timing to have at least one successful transmit/receive pair according to the eSCO operation constraints described above. The gap pattern of FIG. 13 offers improved LTE performance, as it only shuts down LTE 40% of the time, thus improving LTE throughput over the gap pattern shown in FIG. 12. The gap pattern of FIG. 13 also permits satisfactory eSCO operation for any eSCO pattern phase offset from the LTE frame timing.

Figure 14:
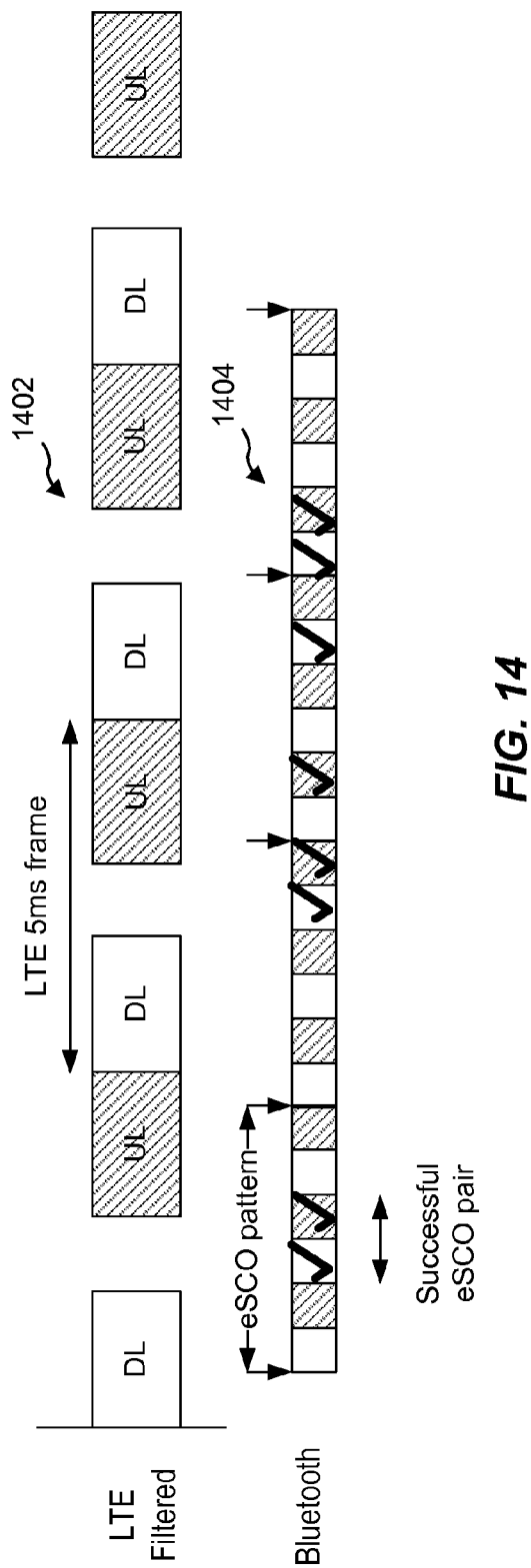
FIG. 14 illustrates LTE filtering according to one aspect of the present disclosure.
Figure 15:
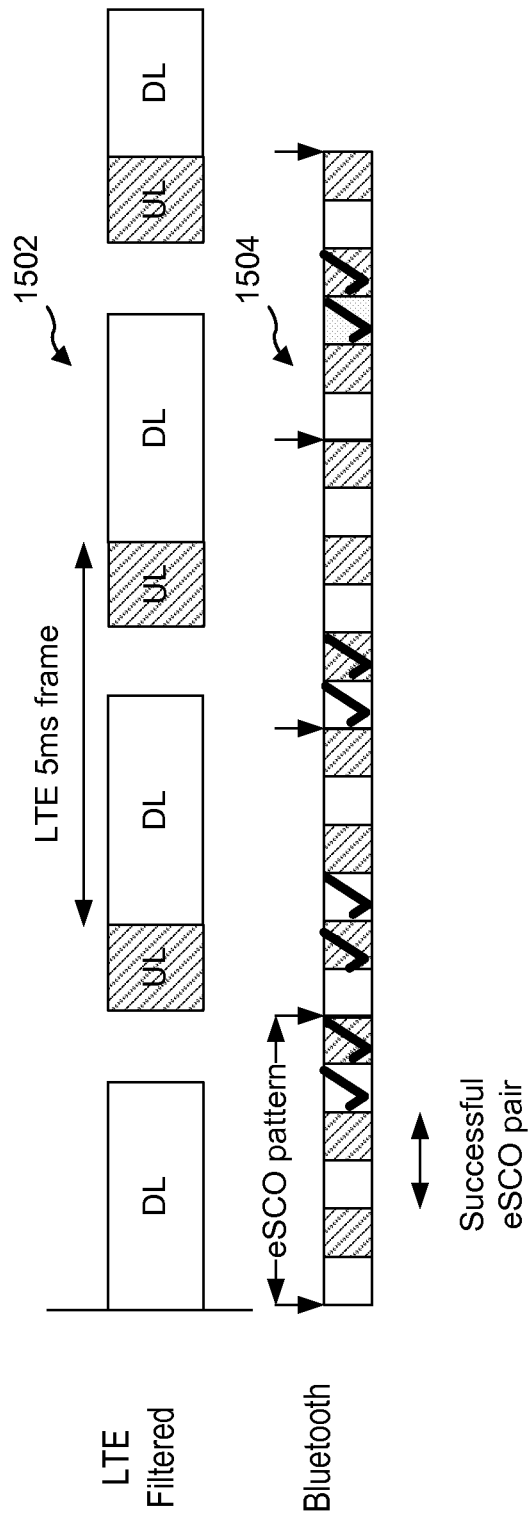
FIG. 15 illustrates LTE filtering according to one aspect of the present disclosure.

In another aspect, if the offset between the eSCO pattern and the LTE frame timing is known, the gap pattern may be configured to reduce or minimize the time when LTE is off. FIG. 14 shows one such configuration where only the third downlink subframe is turned off to create the gap pattern. (For ease of illustration, only the filtered LTE signal 1402 and Bluetooth signal 1404 are shown in FIG. 14.) FIG. 15 shows one such configuration where only the first uplink subframe is turned off to create a gap pattern. (For ease of illustration, only the filtered LTE signal 1502 and Bluetooth signal 1504 are shown in FIG. 15.) The gap pattern configurations of FIGS. 14 and 15 only turn off LTE 20% of the time (1 ms out of every 5 ms frame) and thus represent an improvement over FIG. 13 in terms of LTE throughput loss.

In one aspect, the following method may be implemented to determine a desired gap configuration. Let x be the phase offset between the LTE frame timing and Bluetooth eSCO pattern, where x is between 0 and 5 ms. For a given LTE frame, Di will be denoted to be downlink (DL) subframe i, where i may equal 1, 2, or 3, and Uj will be denoted to be uplink (UL) subframe j, where j may equal 1 or 2. A UE may calculate the phase offset x between the eSCO pattern and the LTE frame timing. This offset x may be used to characterize the gap pattern to meet a specific criteria. The UE may use this x to calculate the gap and transmit the gap pattern to the eNB scheduler. The UE may alternatively transmit x directly to the eNB which would calculate the gap pattern. The UE may calculate the gap pattern from x and utilize other techniques to create the gap pattern, for example, through buffer status reports, channel quality index reports, or denying LTE uplink/downlink subframes that belong to the gap. The UE may determine a gap configuration that allows satisfactory Bluetooth operation for a particular Bluetooth offset and reduces or minimizes the impact to LTE performance.

Further, an off pattern that spans four LTE half-frames (20 ms) may be defined as: Ai, Aj, Ak, Al, where A={D,U} and the subscript denotes the corresponding subframe. If A=0, no quieting (i.e., no shutting down of LTE) is desired for this sub-frame.

By only using the third downlink subframe to create the gap (as pictured in FIG. 14, i.e., quieting D3, D3, D3, D3 . . . ), substantially all eSCO phase offsets are supported. Thus, if the phase offset (x) is between approximately 0.125 and 1.325 ms, between 1.375 and 2.575 ms, between 2.625 and 3.825 ms, or between 3.875 and 5.075 ms, the gap configuration of FIG. 14 will allow proper Bluetooth eSCO operation taking into account eSCO operational constraints described above. The remaining portion of eSCO phase offset cases are supported by quieting the first uplink frame (as pictured in FIG. 15, i.e., quieting U1, U1, U1, U1 . . . ). Thus, if the phase offset (x) is between approximately 0 and 0.2 ms, between 1.25 and 1.45 ms, between 2.5 and 2.7 ms, or between 3.75 and 3.95 ms, the gap configuration of FIG. 15 will allow proper Bluetooth eSCO operation taking into account eSCO operational constraints described above. Thus, the gap pattern of FIG. 14 or FIG. 15 may be chosen to ensure proper Bluetooth operation depending on the eSCO phase offset x.

Figure 16:
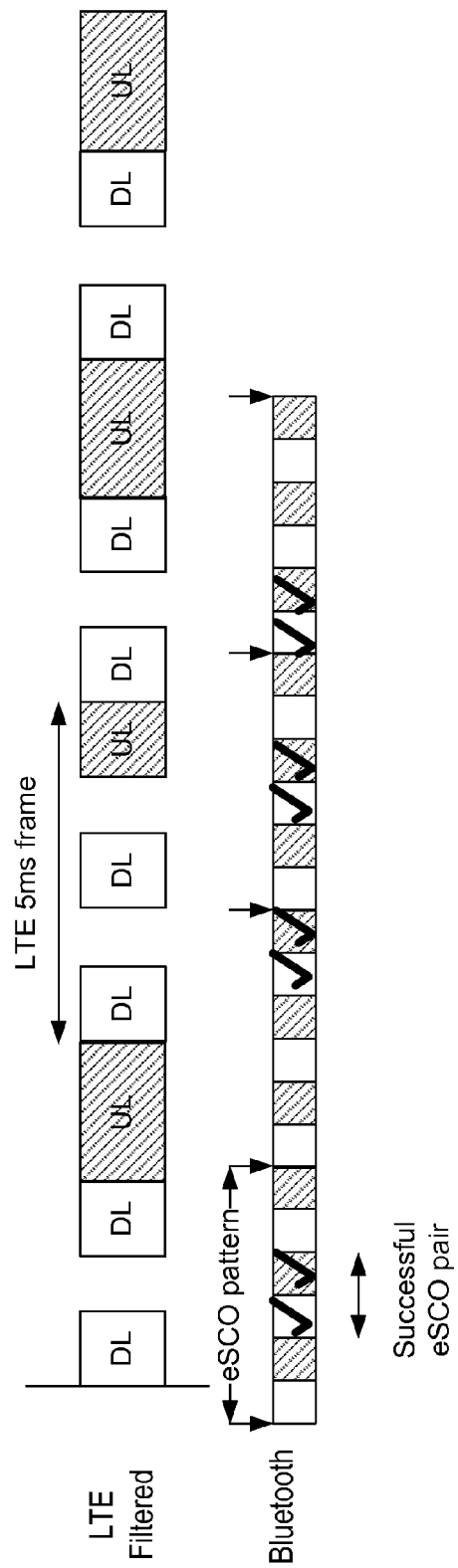
FIG. 16 illustrates LTE filtering according to one aspect of the present disclosure.

Other gap pattern configurations are also possible. According to one aspect, the middle downlink subframe (the second downlink subframe) may be quieted for three LTE half-frames, supplemented by quieting the first uplink subframe during the third half-frame. (Resulting in a quieting pattern of D2, D2, D2U1, D2, . . . ) This gap pattern will create 1 ms gaps for two half-frames followed by a half-frame with a 2 ms gap. An example of this gap pattern is shown in FIG. 16. This gap pattern would allow proper Bluetooth operation for 40% of the possible eSCO offsets.

Figure 17:
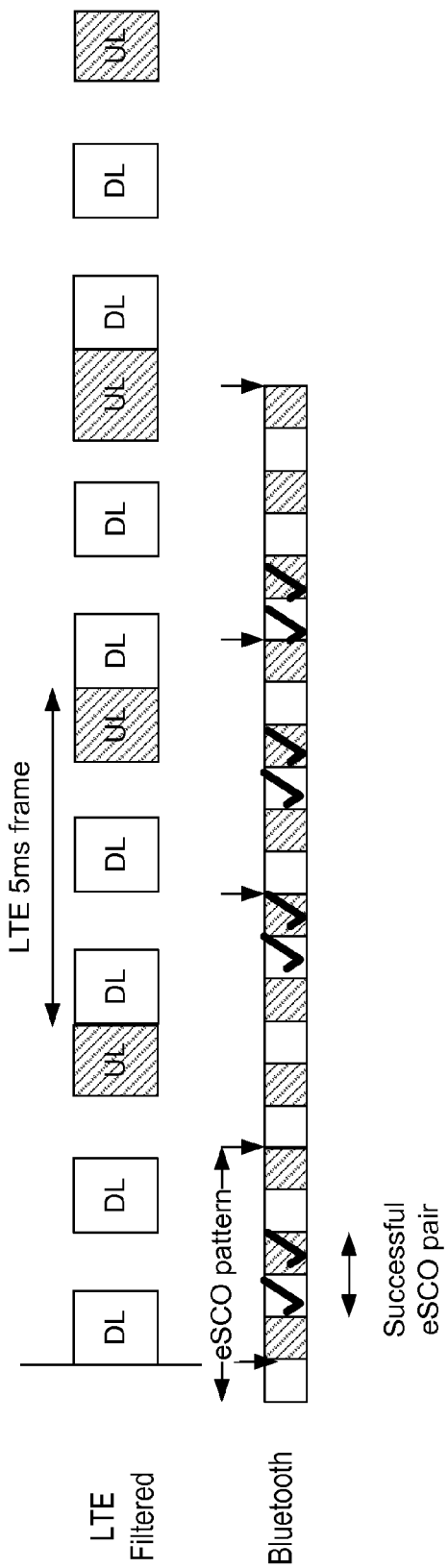
FIG. 17 illustrates LTE filtering according to one aspect of the present disclosure.

Another configuration may quiet the second downlink subframe and the first uplink subframe in every LTE frame, resulting in a quieting pattern of D2U1, D2U1, D2U1, D2U1 . . . . An example of this gap pattern is shown in FIG. 17. This gap pattern works for more phase offsets than the pattern in FIG. 16, but also results in a 40% throughput loss to LTE, more than the throughput loss of the gap pattern of FIG. 16.

Selecting Gap Patterns Based on Timeline Constraints

The gap pattern may be selected to meet various criteria, including some timeline constraints or criteria. Timeline constraints may include grants or other scheduling activity, and/or Hybrid Automatic Repeat Request (HARQ) or other acknowledgement/negative acknowledgement timelines. Gap patterns may also be selected to reduce throughput loss, protect certain control channels or subframes, etc.

The examples above all illustrate gap pattern configurations using LTE TDD configuration 1 (DDDUU). The above teachings regarding TDM configurations are not limited to LTE TDD configuration 1. Similarly, the teachings below regarding timeline constraints/HARQ process configuration are not limited to TDD configuration 1. The provided teachings may be applied to other TDD configurations. In particular the methods of calculating the offset between eSCO and LTE timing, and applying the offset to calculate a desired gap pattern may be utilized with various TDD configurations. It may be desirable to design gap patterns that work for a wide range of offsets while reducing or minimizing the LTE gap time. As noted, the UE may calculate the offset and send it to an eNB to select a gap pattern, or the UE may select the gap pattern and send it to an eNB. The UE may also track if the offset drifts and may cause the gap pattern to be updated accordingly.

An eNB may assign HARQ processes in a manner that facilitates TDM operation for coexistence, as described above. In particular, three methods may be used to determine HARQ processes. First, established HARQ processes may be associated with "universal" TDM gap patterns that provide sufficient operability for any eSCO offset (and may in particular be used when the eSCO offset is unknown). Second, when the frame offset is known, an established HARQ process may be chosen for a particular gap pattern that works with the known offset. The particular HARQ process may be chosen to increase/maximize throughput. Third, when the frame offset is known, a HARQ process may be customized for the particular gap pattern that works with the known offset. These three methods are described below.

Figure 18A:
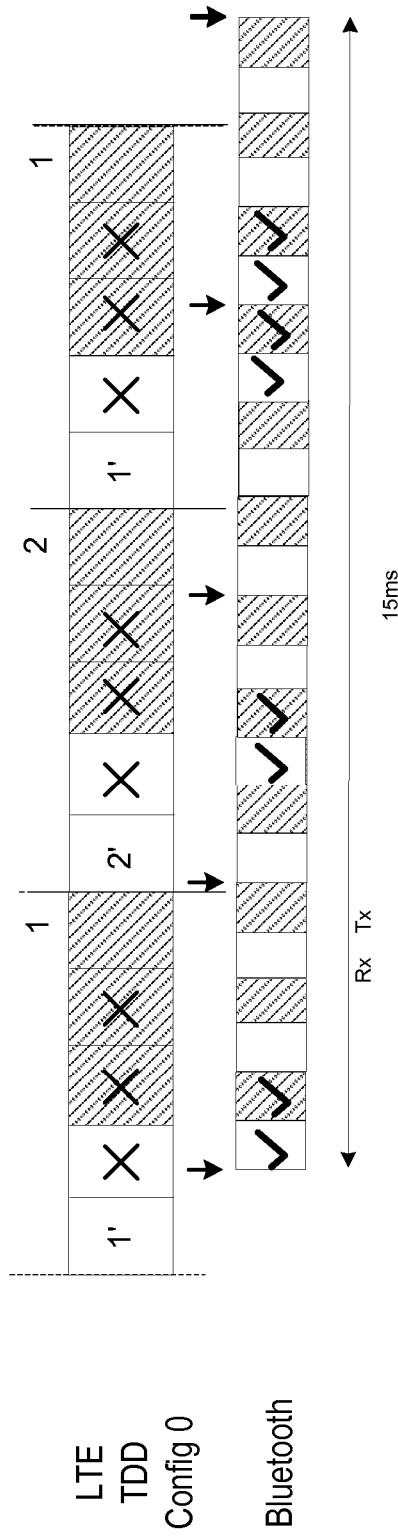
FIG. 18A illustrates HARQ process selection for TDD Configuration 0 according to one aspect of the present disclosure.

In a first method for HARQ process selection, for a given TDD configuration, established configurations of HARQ processes are selected such that the TDM gap pattern obtained allows coexistence with eSCO Bluetooth for any eSCO offset. As with all the methods described herein, this method may be used with multiple TDD configurations. FIG. 18A shows the first method of HARQ process selection with LTE TDD Configuration 0 (DDUUU—2 downlink subframes followed by 3 uplink subframes). In this example, a gap pattern is shown cancelling certain LTE subframes (each marked by an X in FIG. 18A). The cancellation gap pattern shown is D2U1U2, meaning that during each 5 ms LTE half-frame the second downlink, first uplink and second uplink subframes are cancelled. Successful Bluetooth operations are shown during the cancelled subframes on the Bluetooth line with a check mark (✓). The HARQ processes are shown with numerals on the LTE timeline. The numerals 1', 2', and 1' in the downlink subframes indicate the downlink HARQ processes for those respective non-cancelled downlink subframes. The numerals 1, 2, and 1 above the uplink subframes indicate the uplink HARQ processes for those respective non-cancelled uplink subframes.

Figure 18B:
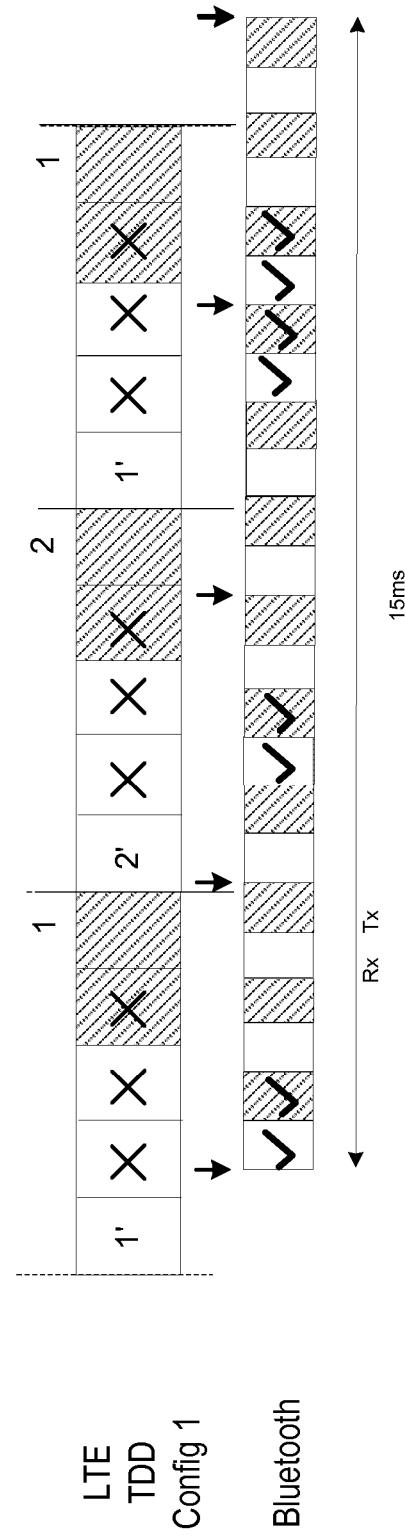
FIG. 18B illustrates HARQ process selection for TDD Configuration 1 according to one aspect of the present disclosure.
Figure 18C:
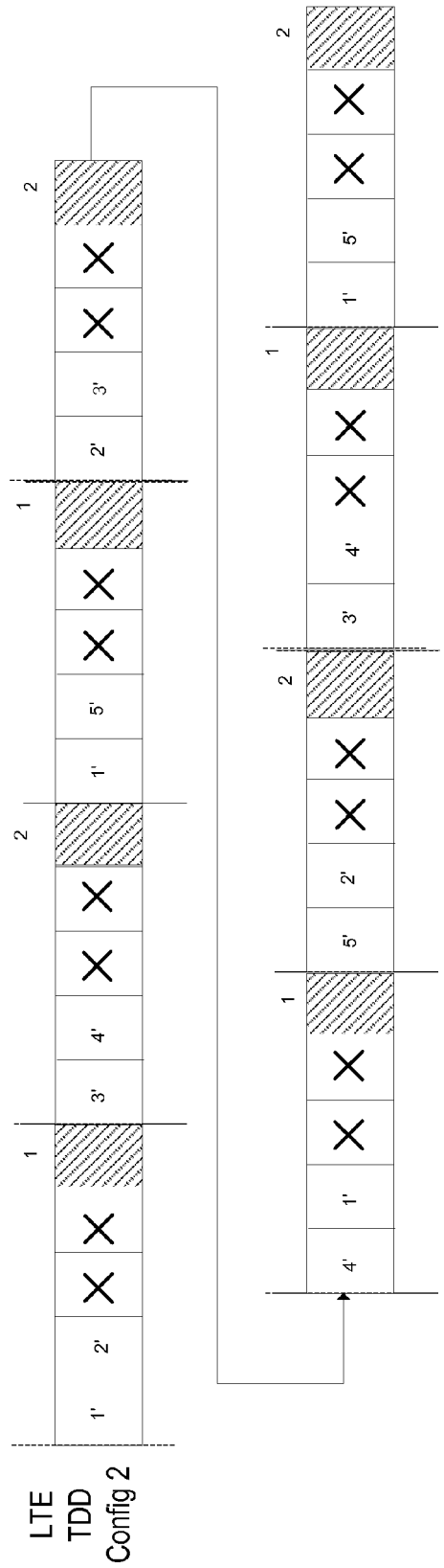
FIG. 18C illustrates HARQ process selection for TDD Configuration 2 according to one aspect of the present disclosure.
Figure 18D:
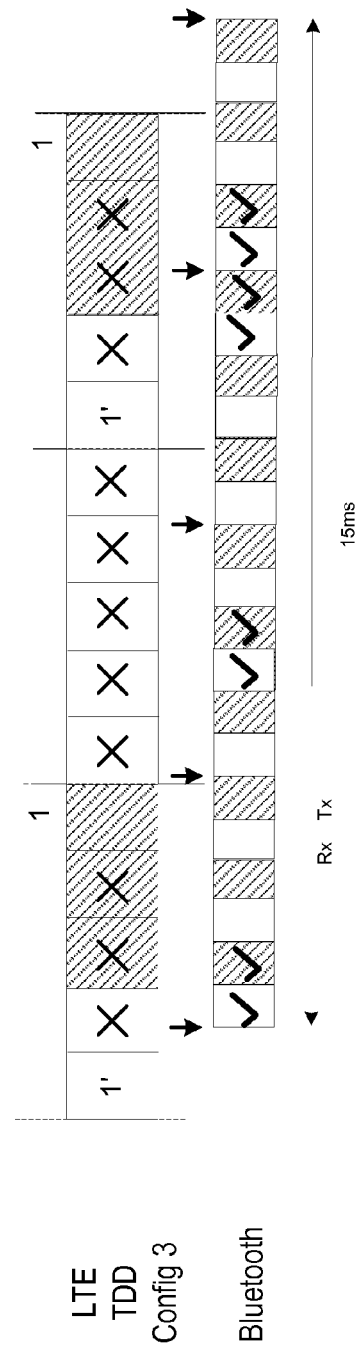
FIG. 18D illustrates HARQ process selection for TDD Configuration 3 according to one aspect of the present disclosure.
Figures 18E, 18F:
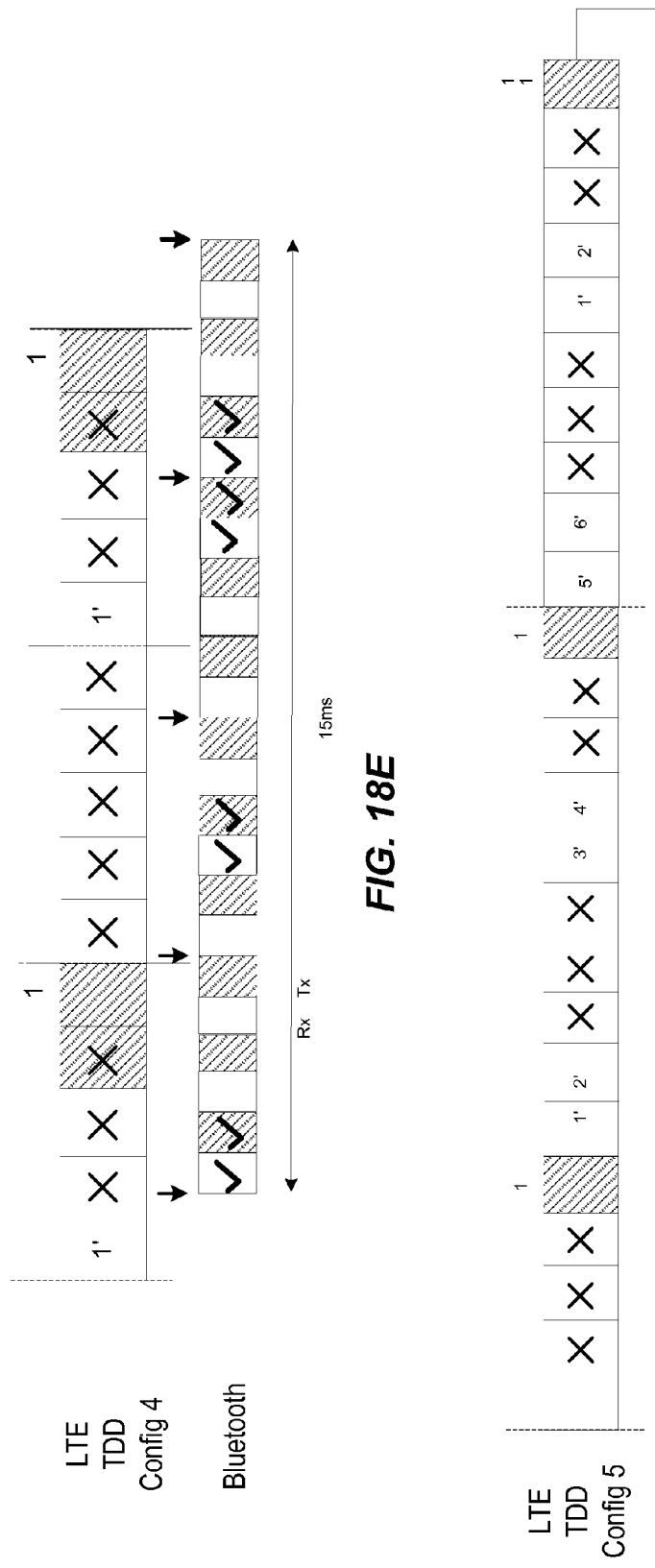
FIG. 18E illustrates HARQ process selection for TDD Configuration 4 according to one aspect of the present disclosure.
FIG. 18F illustrates HARQ process selection for TDD Configuration 5 according to one aspect of the present disclosure.

As noted, this method may be used for multiple TDD configurations. FIG. 18B shown a HARQ arrangement with LTE operating in TDD Configuration 1 (DDDUU—3 downlink subframes followed by 2 uplink subframes). In this example, the cancellation gap pattern shown is D2D3U1, meaning that during each LTE half-frame the second downlink, third downlink, and first uplink subframes are cancelled. FIG. 18C shown a HARQ arrangement with LTE operating in TDD Configuration 2 (DDDDU—4 downlink subframes followed by 1 uplink subframe). In this example, the cancellation gap pattern shown is D3D4, meaning that during each LTE half-frame the third and fourth downlink subframes are cancelled. FIG. 18D shown a HARQ arrangement with LTE operating in TDD Configuration 3 (DDUUU, DDDDD, i.e., one half-frame with 2 downlink subframes and three uplink subframes followed by one half-frame with 5 downlink subframes). In this example, the cancellation gap pattern shown is D2U1U2, D1D2D3D4D5, meaning that during the first LTE half-frame the second downlink, first uplink and second uplink subframes are cancelled and in the second LTE half-frame all downlink subframes are cancelled. These teachings are similarly applied for TDD Configuration 4 (as shown in FIG. 18E) and TDD Configuration 5 (as shown in FIG. 18F).

Figure 19:
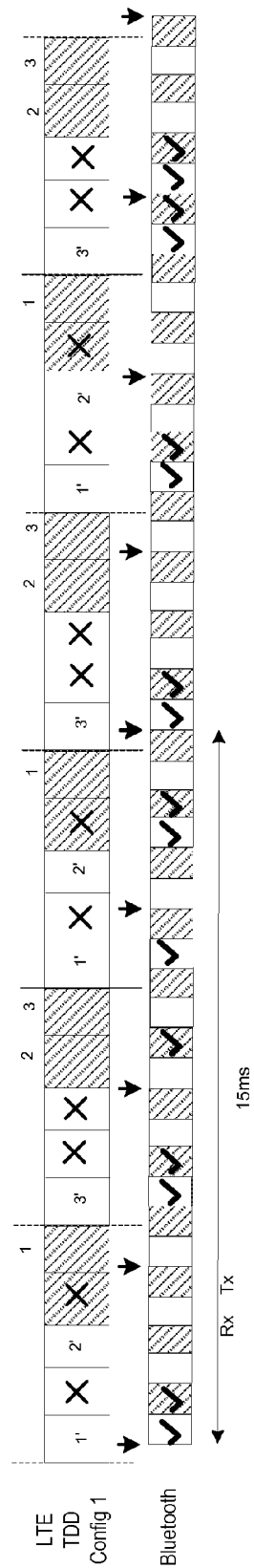
FIG. 19 illustrates HARQ process selection for TDD Configuration 1 according to one aspect of the present disclosure.

In a second method for HARQ process selection, established configurations of HARQ processes are chosen to match a given eSCO offset, TDD configuration, and gap pattern. In this situation, the eSCO offset is known. A UE may characterize an offset between the eSCO and LTE TDD timelines (and may communicate the offset to an eNB). This offset may be used to select a HARQ process that facilitates TDM operation with the eSCO offset. The HARQ process may be selected to reduce/minimize throughput loss or increase/maximize the LTE rate on the downlink and/or uplink. A sample of a HARQ process selection for this method is shown in FIG. 19. In this example, showing LTE operating in TDD Configuration 1, the cancellation gap pattern shown D2U1, D2D3, meaning that during the first LTE half-frame the second downlink and first uplink subframes are cancelled and in the second LTE half-frame the second and third downlink subframes are cancelled. Three HARQ processes are utilized on the downlink, specifically HARQ processes 1' and 2' in the first half-frame and HARQ process 3' in the second half-frame. Three HARQ processes are utilized on the uplink, specifically HARQ process 1 in the first half-frame and HARQ processes 2 and 3 in the second half-frame. For ease of illustration, this method is only illustrated with regard to TDD configuration 1, but similar approaches may be used to assign HARQ processes as a function of eSCO offset for different TDD configurations. This second technique is more computationally complex than the simpler first technique but is also more likely to yield improved results.

To select which HARQ process to cancel for a given LTE TDD configuration and time offset between the eSCO and LTE timelines, a search may be performed for a process which provides at least one successful Bluetooth slot pair for each eSCO packet, and at the same time improves LTE throughput on the downlink, uplink, or some combination of uplink and downlink. It may be desirable to have a limited number of gap patterns to reduce communications overhead between the UE and eNB when selecting the gap pattern and the HARQ processes. A limited number of TDM gap patterns and HARQ processes may be designed using a search described above and then quantized to a set of patterns. The UE may feedback the offset to the eNB, where the eNB calculates the TDM gap pattern and notifies the UE. Alternatively, a standardized set of gap patterns may be designed and the UE may calculate the offset and map this offset to one of the gap patterns in the standardized set. The UE may then feedback the index of the selected gap pattern to the eNB which would then confirm via a feedback message to the UE that the UE's gap pattern is approved by the eNB. The eNB may also determine that a UE should implement a default gap pattern that works for any offset (a universal gap pattern) depending on scheduler complexity.

In a third method for HARQ process selection, HARQ processes may be customized to the known eSCO offset, TDD configuration, and TDM gap pattern. The HARQ TDD configuration, an exhaustive set of HARQ compliant gap patterns is identified. In one example there are two sets of patterns identified. First, all possible patterns are considered with the restriction that each used downlink and uplink subframe in the pattern can carry data traffic.

Second, possible patterns are considered where non-data downlink and uplink subframes are allowed. All such possible patterns may be considered. A non-data downlink subframe may only carry an uplink grant/PHICH. A non-data uplink subframe may only carry an acknowledgement (ACK) or other control information.

For a given TDD configuration, several groups of subframes may be defined, as shown in Table 1 below. For example, a Group 1 in TDD configuration 2 may include {9,0,1}/3/7 where any subset of subframes 9, 0, 1 may be used with subframes 3 and 7. In Table 1, the symbol ($\Phi$) denotes an empty set and "\$\Phi$" indicates do not select from the empty set.

TABLE 1

Figure 20:
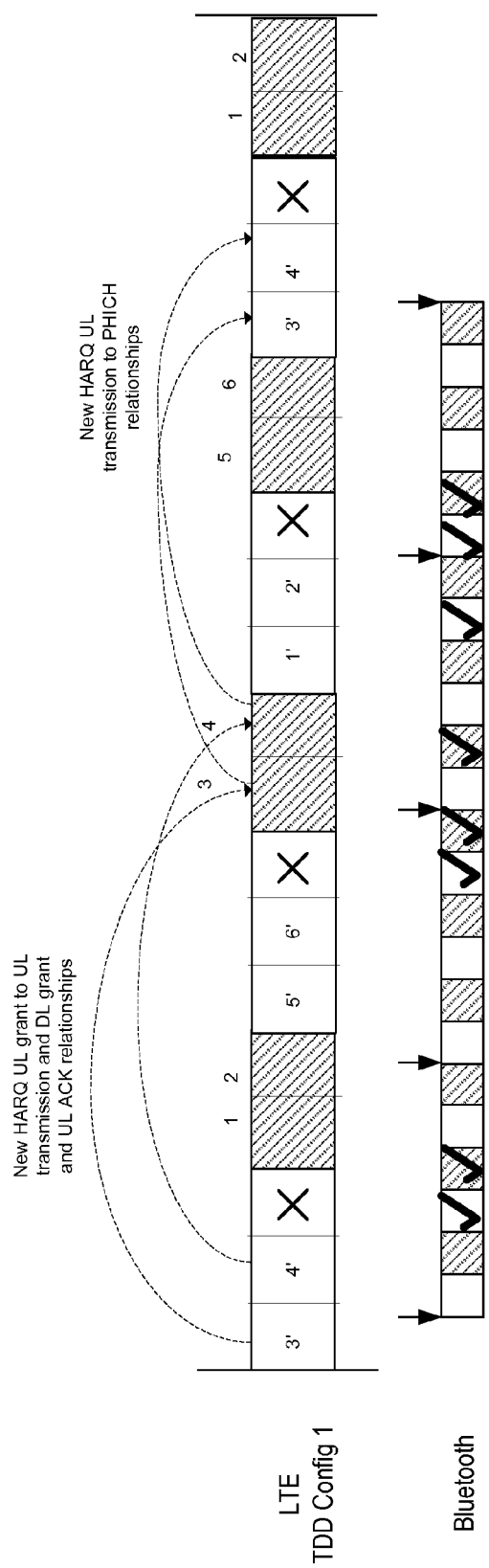
FIG. 20 illustrates HARQ process selection for TDD Configuration 1 according to one aspect of the present disclosure.
Figure 21:
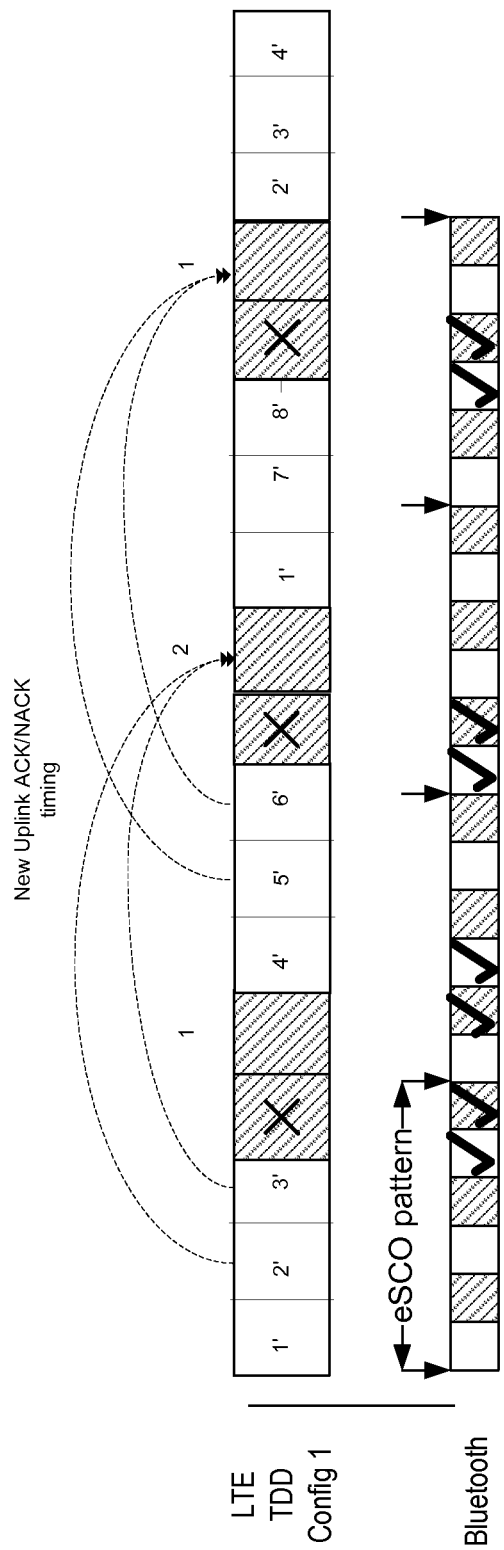
FIG. 21 illustrates HARQ process selection for TDD Configuration 1 according to one aspect of the present disclosure.

| TDD Configuration | Without Non-Data subframe | With Non-Data subframes |
|---|---|---|
| 1 | Group 1: 0/1/7 or 1/7 or $\Phi$ | Group 1: {0, 1}\$\Phi$/7 |
|   | Group 2: 5/6/2 or 6/2 or $\Phi$ | Group 2: {5, 6}\$\Phi$/2 |
|   | Group 3: 4/8 or $\Phi$ | Group 3: 4/8 or $\Phi$ |
|   | Group 4: 9/3 or $\Phi$ | Group 4: 9/3 or $\Phi$ |
| 2 | Group 1: {9, 0, 1}/3/7 | Group 1: {9, 0, 1, 3}\$\Phi$/7 or $\Phi$ |
|   | Group 2: {4, 5, 6}/8/2 | Group 2: {4, 5, 6, 8}\$\Phi$/2 or $\Phi$ |
| 3 | Set 1: 0/4 | Group 1: {0, 9}\$\Phi$/4 or $\Phi$ |
|   | Set 2: 0/9/3/4 | Group 2: {7, 8, 9}\$\Phi$/3 or $\Phi$ |
|   | Set 3: {1, 5, 6, 7}/8/9/0/2/3/4 | Group 3: {1, 5, 6, 8}\$\Phi$/2 or $\Phi$ |
| 4 | Set 1: {6, 7}/9/3 | Group 1: {0, 1, 4, 5, 8}\$\Phi$/2 or $\Phi$ |
|   | Set 2: {0, 1, 4, 5, 6, 7}/8/9/2/3 | Group 2: {6, 7, 8, 9}\$\Phi$/3 or $\Phi$ |
| 5 | Group 1: {0, 1, 3, 4, 5, 6, 7, 9}/8/2 | Group 1: {0, 1, 3, 4, 5, 6, 7, 8, 9}/2 |
| 6 | Group 1 to Group 6 defined for each of the paired DL/UL HARQ processes | Group 1 to Group 6 defined for each of the paired DL/UL HARQ processes |
| 0 | Group 1: 0/4 | Group 1: 0/4 |
|   | Group 2: 1/7 | Group 2: 1/7 |
|   | Group 3: 5/9 | Group 3: 5/9 |
|   | Group 4: 6/2 | Group 4: 6/2 |
|   | Also, all 10 used subframes | Also, all 10 used subframes | processes may be customized to improve throughput. Specialized HARQ processes specifically for given eSCO offset, TDD configurations, and TDM gap patterns may be created, rather than relying on HARQ processes that may be available in a standard. FIG. 20 shows customized HARQ processes repeated over three frames. FIG. 20 corresponds with the gap pattern shown in FIG. 14. FIG. 21 shows customized HARQ processes corresponding to the gap pattern shown in FIG. 15. For ease of illustration, this method is only illustrated with regard to TDD configuration 1, but similar approaches may be used to customize HARQ processes as a function of eSCO offset for different TDD configurations. This third technique is more computationally complex than the previous techniques but is also more likely to yield improved results. HARQ processes may be selected as described above.

Determining Desired HARQ Gap Patterns

To be HARQ compliant, a gap pattern permits sending ACK (acknowledgement) for downlink, and obtaining an uplink grant, as well as PHICH (physical hybrid automatic repeat request indicator channel) (i.e., uplink ACK). Optionally, in another aspect, the most desired gap pattern also has low downlink/uplink throughput loss for LTE.

One aspect of the present disclosure describes a methodology for finding gap patterns. In particular, for each LTE In one aspect, any choice of subframes within a group is HARQ compliant within itself for both downlink and uplink if non-data subframes are not allowed, or for either downlink or uplink if non-data subframes are allowed. In one aspect, a particular HARQ pattern results from one choice from each of the defined groups. For example, for configuration 2, Group 1 equals {9,0,1}/3/7 and Group 2 equals {4,5,6}/8/2. A possible HARQ pattern is subframes 9/3/7/4/5/8/2 which may also be represented using a 10-bit pattern for the 10 subframes in 10 ms as 0011110111.

Alternately, in some cases, there are not multiple groups, but instead different sets of subframes so that a HARQ pattern is chosen from a particular set only. For example, for configuration 4, Set 1={6,7}/9/3 and Set 2={0,1,4,5,6,7}/8/9/2/3.

Optionally, HARQ patterns for TDD configuration 6 may be obtained in a different manner. Six paired downlink/uplink HARQ processes use the subframes as shown in TABLE 2. The subframes used for each HARQ process repeat after six radio frames. The set of all HARQ patterns can be obtained by choosing one or more of the six HARQ processes. For configuration 6, the HARQ patterns may be represented using a 6-bit pattern.

TABLE 2

| Radio Frame | HARQ #1 | HARQ #2 | HARQ #3 | HARQ #4 | HARQ #5 | HARQ #6 |
|---|---|---|---|---|---|---|
| RF n | 0/7 | 1/8 | 5 | 2/6 | 3/9 | 4 |
| RF n + 1 | 1/8 | 5 | 2/6 | 3/9 | 4 | 0/7 |
| RF n + 2 | 5 | 2/6 | 3/9 | 4 | 0/7 | 1/8 |
| RF n + 3 | 2/6 | 3/9 | 4 | 0/7 | 1/8 | 5 |
| RF n + 4 | 3/9 | 4 | 0/7 | 1/8 | 5 | 2/6 |
| RF n + 5 | 4 | 0/7 | 1/8 | 5 | 2/6 | 3/9 |
| RF n + 6 | 0/7 | 1/8 | 5 | 2/6 | 3/9 | 4 |

A new weight metric may be defined for each HARQ pattern to enable the ranking of various gap patterns. In one example, each downlink subframe adds 1 to the weight of a pattern only if the uplink subframe containing an ACK is also present in the pattern. Additionally, each uplink subframe adds 1 to the weight of a pattern only if downlink containing a grant/PHICH is also present in the pattern. The weight is set to zero if either downlink or uplink weight is zero. Those skilled in the art will appreciate that other weight metrics may also be considered where the weighting is any function of the used downlink and uplink subframes. Further, the weight metric may be adjusted based on other criteria such as downlink and/or uplink traffic specifications on LTE.

Optionally, in another aspect, for a given TDD configuration, the Bluetooth transmit (Tx) and receive (Rx) packet error rate (PER) is computed for every possible HARQ pattern and every possible timing offset between LTE and Bluetooth. In one example, the overlap of LTE transmit with Bluetooth receive leads to Bluetooth receiver error and Bluetooth transmission is not sent if it overlaps with LTE receive in the pattern.

A uniform sampling of all possible offsets may be considered for computing the packet error rate. For example, if Bluetooth uses a 6 slot eSCO, the timing offsets range from 0 to 3.75 ms and 100 offsets, separated by 37.5 us, may be used. For 10 ms HARQ patterns (TDD configurations 0-5) with 6 slot Bluetooth eSCO, the packet error rate may be computed over a 30 ms duration because the overlap patterns repeat after that. For TDD configuration 6, the HARQ pattern has 60 ms periodicity and the overlap also repeats after that.

Additionally, the computation may be performed separately for both Bluetooth master and slave. Those skilled in the art will appreciate that various eSCO configurations may be used, such as, but not limited to eSCO with 12 slots.

For each HARQ pattern, the sum of the Bluetooth transmit (Tx) and receive (Rx) packet error rate may be computed across all offsets. The HARQ patterns for which the combined sum is zero are then selected. Among the selected HARQ patterns with zero sum across all offsets, the patterns with the highest weight are selected. These patterns are called universal patterns because they work for any timing offset between LTE and Bluetooth operating in a slave mode. The criterion for selecting a universal pattern may be modified so that it yields an acceptable Bluetooth performance for all offsets (instead of zero packet error rate (PER)). The target Bluetooth packet error rate (PER) can depend on the current Bluetooth link error rate seen due to the Bluetooth link (i.e., without LTE). For example, a 3% target may be selected if the Bluetooth link error is 10%. Alternatively, a certain number of successful Bluetooth transmit and receive slots per eSCO interval may also be used as criteria for Bluetooth performance.

For each given offset, the highest weight HARQ patterns that lead to acceptable Bluetooth performance (such as zero Tx and Rx PER) are listed. In one aspect, the number of patterns used for all offsets is reduced or minimized. An example of reducing/minimizing the number of patterns is described as follows. For each offset, all of the patterns having the highest weight are listed. The rank of all of the found patterns are computed based on the number of times the pattern appears in all offsets. For each offset, the highest rank pattern is selected. For offsets leading to a weight equal to the weight of the universal pattern, the universal pattern is chosen. In one aspect, the universal patterns found for TDD configuration 1 for Bluetooth slave, with a weight 5, included: 0011011001, 0011110011, 1001100111 and 1100100110. TABLE 3 shows a set of universal patterns for Bluetooth Slave for all TDD configurations.

TABLE 3

| TDD Configuration | Universal Patterns | Weight of universal patterns |
|---|---|---|
| 0 | 0010011001 | 4 |
|   | 1000110001 |   |
|   | 1100100100 |   |
| 1 | 0011011001 | 5 |
|   | 0011110011 |   |
|   | 1001100111 |   |
|   | 1100100110 |   |
| 2 | 0011100111 | 6 |
| 3 | 0011010011 | 4 |
|   | 1001100001 |   |
| 4 | 0011110011 | 6 |
| 5 | 0010110011 | 5 |
|   | 0011100011 |   |
|   | 0011100110 |   |
| 6 | 000011 | 2 |
|   | 000110 |   |
|   | 001100 |   |
|   | 011000 |   |
|   | 110000 |   |
|   | 100001 |   |

In another aspect, a method of finding gap patterns for a Bluetooth operating in master mode is described. For a Bluetooth master, the highest weight patterns that give acceptable Bluetooth performance are first found for each offset. The maximum weight among the highest weights for each offset is then computed. The set of acceptable patterns and offsets corresponding to this maximum weight are then listed. These are the frame aligned patterns because the master can adjust its timing to these offsets. To reduce or minimize the number of patterns, the frame aligned pattern(s) that is also part of the pattern for the Bluetooth slave may be selected. TABLE 4 lists possible HARQ patterns for a Bluetooth master adjusting its time offset. For configurations 0 and 1, weight 10 patterns are selected that correspond to the frame alignment with no LTE loss. For the remaining configurations, there may be some LTE loss and the highest weight patterns are listed in the table.

TABLE 4

| TDD Configuration | Frame aligned Pattern (10-bit for Config. 0-5) | Weight |
|---|---|---|
| 0 | 1111111111 | 10 |
| 1 | 1111111111 | 10 |
| 2 | 1111011110 | 8 |
|   | 1011110111 |   |
|   | 0111101111 |   |
|   | 0111110111 |   |
|   | 1011101111 |   |

TABLE 4-continued

| TDD Configuration | Frame aligned Pattern (10-bit for Config. 0-5) | Weight |
|---|---|---|
| 3 | 1111111101 | 8 |
| 4 | 1011111011 | 8 |
| 5 | 0111110111 | 8 |
| 6 | Any four 1s and two 0s in the 6-bit pattern | 4 |

In the above described methodology, the HARQ patterns with the highest weight are selected. Optionally, in another aspect, HARQ patterns having a particular weight are selected, where the particular weight is not the highest weight.

In another aspect, discontinuous reception (DRX) may be employed to perform offset based pattern selection by a Bluetooth master or slave. A UE can signal DRX parameters to request a particular gap pattern. Offset signaling and bitmask signaling may also be used. For 10 ms DRX operation, a bitmask for downlink subframes may be consecutive for certain cyclic shift configurations. For example, in TDD configuration 3 (DSUUUDDDDD), there are seven downlink radio subframes in each 10 ms radio frame. For HARQ pattern 1001100001, the bitmask for downlink subframes is the 7-bit pattern 1000001. After a cyclic shift of 1, the 7-bit pattern becomes 1100000 which has consecutive 1s, meaning 10 ms DRX is applicable. Here the value for on Duration may be set to 2, the value for drxStartOffset may be set to 9 and the value of drxCycle may be set to 10, as defined in the LTE specification.

For 5 ms DRX operation, certain conditions may be applied to the first half 5 ms and the second half ms over some 10 ms interval. Similar conditions may also apply for 2 ms DRX. First, if there is an unused downlink subframe in either half, then there are no other used downlink subframes after the unused downlink subframe. This condition ensures that there be no unused downlink subframes within the on Duration in a DRX cycle. Second, if one or both halves have unused downlink subframes, then the number of used downlink subframes before the first unused downlink subframe (represented by the quantity M, mentioned below) must be equal in both halves and non-zero. This condition ensures that the same value of on Duration may be used if there is more than one half with unused downlink subframes. Third, the number of downlink subframes in either half that does not have an unused downlink subframe must be less than or equal to the value of M defined above. This condition ensures that in the halves that don't have unused downlink subframes, the available downlink subframes can be used. If these conditions are met, then 5 ms is applicable and on Duration is set to either M or another non-zero integer value less than M.

As an example for 5 ms DRX operation, for TDD configuration 1 (DSUUDDSUUD), the bitmask 1011110111 meets the three conditions described above. Thus, 5 ms DRX is applicable. Here the value for on Duration may be set to 2, the value for drxStartOffset may be set to 4 and the value of drxCycle may be set to 5. Using a DRX approach, a weight metric of a HARQ pattern may be set to 0 if a 10 ms, 5 ms, or 2 ms DRX is unable to achieve the desired pattern.

Another aspect discloses gap pattern selection at the eNodeB, where the eNodeB may select gap patterns for various UEs. The eNodeB may receive requests from the UEs for a particular gap pattern. If multiple UEs request the same pattern, and the eNodeB assigns the same requested pattern to all of the requesting UEs, then some of the subframes on the eNodeB side may not be used. In one aspect, the UEs may all request a particular pattern, but the eNodeB may decide to assign different patterns rather than the requested pattern to promote load balancing on the eNodeB side and to ensure that all subframes are being used equally.

In one aspect the eNodeB may use information received from the UE to assist in the eNodeB's gap pattern selection. In particular, if the eNodeB receives a coexistence indication from the UE, the eNodeB can select a gap pattern based on the previously described methodology. The coexistence indication may contain information such as the Bluetooth mode of operation (e.g., master or slave), the LTE-Bluetooth timing offset from the UE, and/or a suggested pattern from the UE. If the eNodeB only receives a coexistence indication from the Bluetooth slave and receives no timing offset with Bluetooth, the eNodeB can select the universal pattern based on the previous methodology. If the eNodeB receives a coexistence indication from the Bluetooth slave with timing offset information, the eNodeB can select the offset-based pattern from the previous methodology. Additionally, if the eNodeB receives a request for a gap pattern from a UE in Bluetooth slave mode, but this gap pattern is not supported, the eNodeB can select the universal pattern. Further, if the eNodeB receives a request for a gap pattern from a UE in Bluetooth master mode, but this gap pattern is not supported, the eNodeB can select another frame aligned pattern for the UE. The eNodeB may recompute the offset based pattern or the universal pattern or the frame aligned pattern if the weight metric changes for any reason such as for application specifications. If the eNodeB is serving several UEs with coexistence issues, which have Bluetooth in either slave or master modes, the eNode B may select and/or assign a pattern to reduce overlap between users. For example, the eNodeB may assign different patterns to different UEs to ensure that different UEs will be scheduled at different times and that there are few or no times without scheduled LTE transmissions. The eNodeB can confirm the final gap patterns to the different UEs having coexistence issues with Bluetooth, where Bluetooth is in master or slave mode.

Another aspect of the present disclosure address the eNodeB configuration. In particular, once a HARQ pattern is selected, the eNodeB may configure the SR/SRS/PRACH (scheduling request/sounding reference signal/physical random access channel) and CQI (channel quality indicator) based on the pattern. The SRS/PRACH may be configured such that they are restricted to the used uplink subframe in the HARQ pattern. The CQI is computed based on downlink subframes that are present in the pattern and are sent on the uplink subframes that are also present in the pattern. In another aspect, if the eNodeB configures any signaling in the subframes not present in the pattern, the eNodeB also accounts for corrupted downlink or unsent uplink portions in the LTE link. For example, if SRS is configured during the uplink of a special subframe (i.e., UpPTS of a Special subframe), the eNodeB may run DTX (discontinuous transmit) detection to determine whether the UE actually sent the SRS or did not send the SRS to prevent a coexistence problem. Moreover, the UE ensures the SRS is not always transmitted when it is configured for subframes not part of the pattern.

Another aspect discloses the UE behavior with HARQ pattern selection. Various factors known at the UE side may aid in pattern selection. In particular, the UE is aware of the timing offset between LTE and a Bluetooth slave due to the presence of a coexistence manager (CxM). The UE may use the previously described methodology to select the best HARQ pattern and request it from the eNodeB, based on the known offset. Alternatively, the UE may send the timing offset to the eNodeB so the selection occurs at the eNodeB.

Additionally, if the LTE uplink is causing little interference to Bluetooth, in one example, the uplink subframes are kept, i.e., they are available for scheduling. Similarly, if Bluetooth is causing little impact on the LTE downlink, then the LTE downlink frames may be kept, i.e., they are available for scheduling. This may also be useful if a power backoff is performed on the Bluetooth side. Additionally, this may be used when packet error rates (PERs) are computed. Because the Bluetooth link condition is known at the UE, the target Bluetooth error rate may be set by the UE.

As the timing offset between LTE and Bluetooth drifts, the UE can request a new offset based gap pattern. If the drift is very fast, the UE can request a universal pattern. If the UE has coexistence issues with the Bluetooth master, the UE can request the frame aligned pattern described above and change its timing offset to use the pattern. If the UE in the Bluetooth master mode requests a frame aligned gap pattern, but the eNodeB assigns a different pattern, the UE can change its timing offset to use the assigned pattern rather than the requested pattern. In one example, the frame aligned pattern is not used or requested if there is no LTE loss. Additionally, the UE can re-compute the HARQ pattern if the weight metric changes.

Once the UE is aware of the particular pattern being used, the UE can account for the empty subframes in its behavior. In particular, the UE will not attempt decoding of the PDCCH (physical downlink control channel) in a downlink subframe which is not part of the pattern. Additionally, if there is no PDCCH, there will not be a PDSCH (physical downlink shared channel) to decode. In another example, the UE does not send a PRACH (physical random access channel) during the uplink of the special subframe (UpPTS of Special subframe) even if it is configured. The UE can account for corrupted downlink subframes (which are not part of the pattern) in any measurements. In other words, the UE will not include the measurements from unused downlink subframes interfering with Bluetooth. Similarly, for UE algorithms that require CRS such as channel estimation, automatic gain control (AGC), frequency and time tracking loops, the UE will not use the CRS in the subframes that are denoted as gaps in the pattern. The UE will also ensure that Bluetooth transmissions are prevented in the downlink subframes that are allocated to LTE in the pattern.

Gap patterns may be constructed to protect certain downlink subframes to ensure proper reception of downlink control signals to a UE. Protection of control signals in this manner may depend on particular operating scenarios. Assuming that initial acquisition has been completed, and the UE is in active connection with a serving cell and engaged in neighbor cell detection, a primary synchronization signal (PSS) and/or secondary synchronization signal (SSS) may be protected. The PSS is sent in subframes 1 and 6. The SSS is sent in subframes 0 and 5. To ensure at least one of PSS and SSS is not blanked, subframes 0 and 1 may be included in the operational portion of the gap pattern. Similarly, if the UE is monitoring the physical broadcast channel (PBCH), which is sent in subframe 0, protecting subframe 0 will protect the PBCH. System information block (SIB) changes may also be protected. SIB1, which carries information about other SIBs, is sent in subframe 5. The gap pattern may constructed to ensure subframe 5 is not blanked. Measurements such as reference signal received power (RSRP) and reference signal received quality (RSRQ) are performed on the reference signal (RS) for both serving and neighbor cells. These measurements may thus be done in the operational downlink subframes.

For a UE operating as a Bluetooth master, for TDD configuration 1, no gap pattern is called for with a 6 slot eSCO operation. For TDD configurations 2 and 3, frame aligned patterns may contain subframes 0, 1, 5, and 6, thus Bluetooth master operation may not be subject to interfered. For a Bluetooth slave, the universal gap patterns may not contain all of subframes 0, 1, 5, and 6 for TDD configurations 1, 2, and 3. In one aspect, subsets of these subframes may be included in the gap pattern. For example, subframes 0 and 1 may be included to ensure the PBCH and one PSS/SSS for each radio frame is protected. This is feasible for TDD configurations 1 and 3 with universal and offset based patterns with the HARQ process approach. It is also possible for the DRX approach. In another example, subframe 5 may be protected to ensure reception of SIB1. This is feasible for TDD configurations 1, 2, and 3 with the HARQ process approach. It is also possible for the DRX approach for TDD configurations 1 and 2. In another example, only subframe 0 may be protected to ensure the PBCH is not blanked. This is feasible for TDD configurations 1, 2, and 3 with the HARQ process approach. It is also possible for the DRX approach for TDD configurations 1 and 2. In certain scenarios, a flexible HARQ process approach may be desired over a DRX approach, such as protecting only subframe 0 in TDD configuration 2.

To protect the desired subframes, gap patterns not including the desired subframes may be given a weight of 0. Similarly, if using a DRX approach, if DRX is not able to achieve the desired pattern, the DRX approach may be assigned a weight of 0. Downlink subframes that should be protected may be added to a HARQ pattern search space for purposes of gap pattern determination, even those downlink subframes not carrying any grant/acknowledgment signals.

The above approaches, while illustrated for TDD configurations, may also be implemented for FDD communications.

Figure 22:
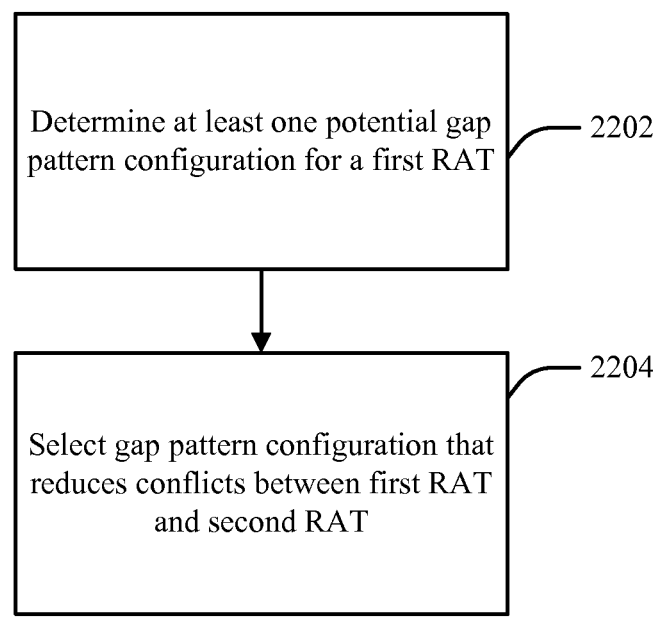
FIG. 22 is a block diagram illustrating gap pattern selection according to one aspect of the present disclosure.

As shown in FIG. 22 an apparatus, such as an eNodeB or UE may determine at least one potential gap pattern configuration for a first radio access technology (RAT), as shown in block 2202. The at least one gap pattern configuration meets at least one scheduling timeline constraint of the first RAT. The apparatus may select one of the at least one potential gap pattern configuration that reduces conflicts between the first RAT and a second RAT, as shown in block 2204

Figure 23:
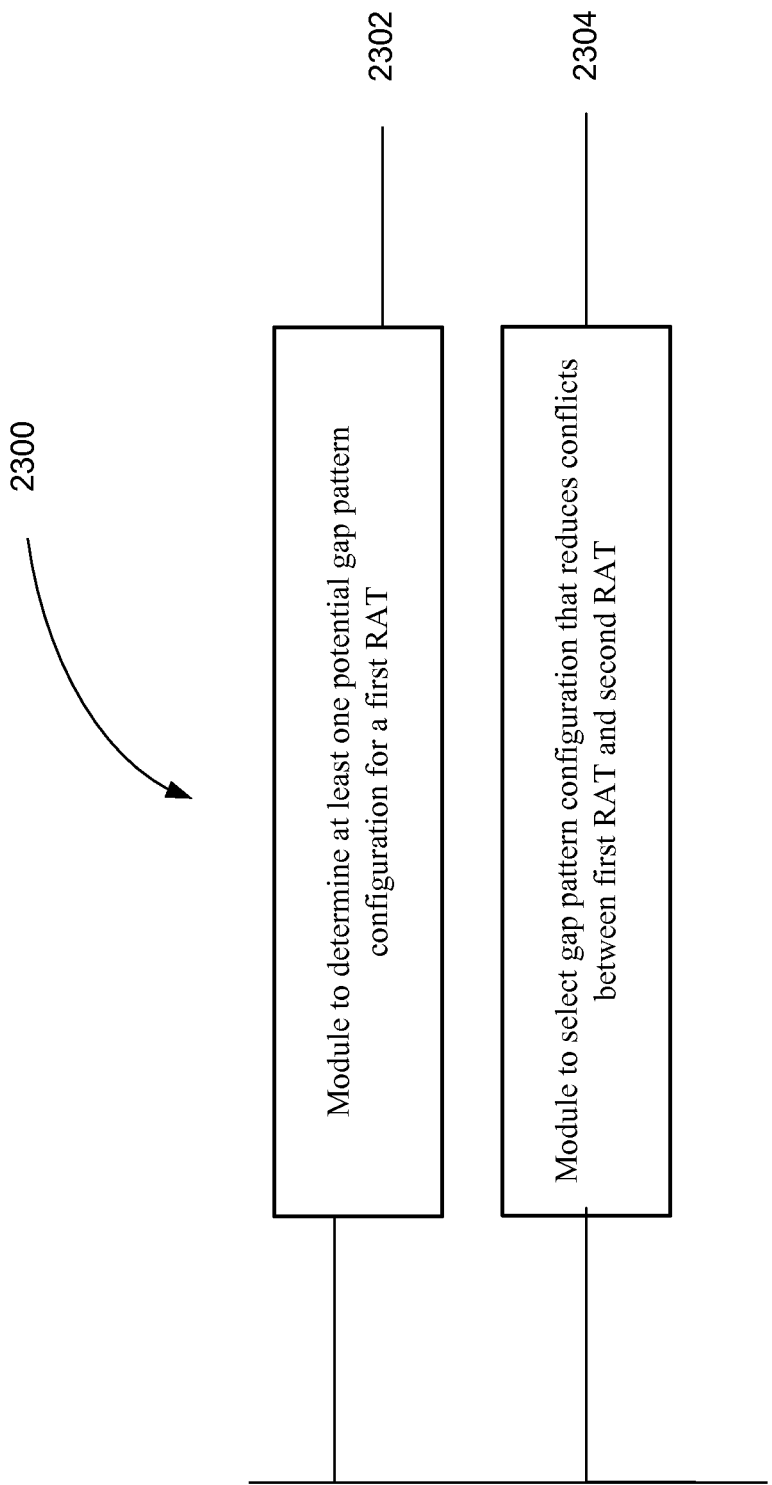
FIG. 23 is a block diagram illustrating components for gap pattern selection according to one aspect of the present disclosure.

FIG. 23 shows a design of an apparatus 2300 for a UE. The apparatus 2300 includes a module 2302 to determine at least one potential gap pattern configuration for a first radio access technology (RAT). The at least one gap pattern configuration meets at least one scheduling timeline constraint of the first RAT. The apparatus 2300 includes a module 2304 to select one of the at least one potential gap pattern configuration that reduces conflicts between the first RAT and a second RAT. The modules in FIG. 23 may be processors, electronics devices, hardware devices, electronics components, logical circuits, memories, software codes, firmware codes, etc., or any combination thereof.

An apparatus may comprise means for determining at least one potential gap pattern configuration for a first radio access technology (RAT). The at least one gap pattern configuration meets at least one scheduling timeline constraint of the first RAT. The apparatus may also comprise means for selecting one of the at least one potential gap pattern configuration that reduces conflicts between the first RAT and a second RAT. In one aspect, the aforementioned means may be processor 230, memory 232, processor 270, memory 272, coexistence manager 640, gap pattern module 1014, timeline constraint module 1016, module 2302, and/or module 2304, configured to perform the functions recited by the aforementioned means. In another aspect, the aforementioned means may be a module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
    determining at least one potential gap pattern configuration for a first radio access technology (RAT), the at least one potential gap pattern configuration satisfying a scheduling timeline constraint of the first RAT and a timeline constraint of a second RAT, each potential gap pattern comprising a subframe for a potential uplink grant and a subframe for hybrid automatic repeat request (HARQ) feedback to satisfy the scheduling timeline constraint of the first RAT;
    selecting one of the at least one potential gap pattern configuration that reduces conflicts between the first RAT and the second RAT; and
    transmitting an indication of the selected gap pattern configuration to a base station, the indication intended for the base station to approve the selected gap pattern configuration and customize at least one HARQ process to correspond with the selected gap pattern configuration, the customizing comprises changing at least one of: uplink HARQ grant to transmission, transmission to acknowledgment (ACK), downlink HARQ grant to ACK, or a combination thereof.

2. The method of claim 1 in which the scheduling timeline constraint comprises at least one of a grant scheduling and HARQ configuration.

3. The method of claim 1 in which the at least one HARQ process is further customized based at least in part on at least one of a frame offset, a frequency division duplex configuration, and a time division duplex configuration, the customizing being based at least in part on increasing throughput of the first RAT on one of uplink communications, downlink communications, a function of uplink and downlink communications, or a combination thereof.

4. The method of claim 1 further comprising adjusting operation of the second RAT based on the selected gap pattern configuration.

5. The method of claim 1 further comprising transmitting, to the base station, at least one of an indication of a frame offset, an indication of a HARQ pattern configuration, an indication of a Bluetooth traffic type, or a combination thereof.

6. The method of claim 1 further comprising, transmitting, to the base station, at least one of a coexistence indication, a Bluetooth operation mode, a RAT timing offset, a desired gap pattern configuration, or a combination thereof.

7. The method of claim 1 in which the selecting is further based at least in part on reducing overlap between multiple user equipments.

8. The method of claim 1 in which the selected gap pattern configuration is different from a desired gap pattern configuration.

9. The method of claim 1 in which the base station configures communication resources to implement the selected gap pattern configuration.

10. The method of claim 9 in which the communication resources comprise at least one of a scheduling request (SR), sounding reference signal (SRS), physical random access channel (PRACH), and channel quality index (CQI).

11. The method of claim 1 further comprising determining a frame offset between communications of the first RAT and the second RAT, in which the at least one potential gap pattern configuration is based at least in part on the determined frame offset.

12. The method of claim 1 further comprising implementing the selected gap pattern configuration with discontinuous reception (DRX).

13. The method of claim 1 in which the selecting is based at least in part on a Bluetooth error performance meeting a threshold.

14. The method of claim 1 in which the selecting is based at least in part on a desired performance of the first RAT.

15. The method of claim 1 in which the selecting is based at least in part on a desired performance of the second RAT.

16. The method of claim 1 in which the selecting is based at least in part on reducing degradation to a subframe containing desired control signals.

17. The method of claim 1 further comprising adjusting communication activity based at least in part on undesired subframes in the selected gap pattern configuration.

18. The method of claim 1, further comprising assigning a weight metric to each potential gap pattern configuration, the weight metric calculated based on a function of a downlink subframe and an uplink subframe used in each potential gap pattern configuration.

19. An apparatus for wireless communications, comprising:
means for determining at least one potential gap pattern configuration for a first radio access technology (RAT), the at least one potential gap pattern configuration satisfying a scheduling timeline constraint of the first RAT and a timeline constraint of a second RAT, each potential gap pattern comprising a subframe for a potential uplink grant and a subframe for hybrid automatic repeat request (HARQ) feedback to satisfy the scheduling timeline constraint of the first RAT;
means for selecting one of the at least one potential gap pattern configuration that reduces conflicts between the first RAT and the second RAT; and
means for transmitting an indication of the selected gap pattern configuration to a base station, the indication intended for the base station to approve the selected gap pattern configuration and customize at least one HARM process to correspond with the selected gap pattern configuration, the customizing comprises changing at least one of: uplink HARQ grant to transmission, transmission to acknowledgment (ACK), downlink HARQ grant to ACK, or a combination thereof.

20. A non-transitory computer-readable medium having program code recorded thereon for wireless communications, the program code comprising:
program code to determine at least one potential gap pattern configuration for a first radio access technology (RAT), the at least one potential gap pattern configuration satisfying a scheduling timeline constraint of the first RAT and a timeline constraint of a second RAT, each potential gap pattern configuration comprising a subframe for a potential uplink grant and a subframe for hybrid automatic repeat request (HARQ) feedback to satisfy the scheduling timeline constraint of the first RAT;
program code to select one of the at least one potential gap pattern configuration that reduces conflicts between the first RAT and the second RAT; and
program code to transmit an indication of the selected gap pattern configuration to a base station, the indication intended for the base station to approve the selected gap pattern configuration and customize at least one HARQ process to correspond with the selected gap pattern configuration, the customizing comprises changing at least one of: uplink HARQ grant to transmission, transmission to acknowledgment (ACK), downlink HARQ grant to ACK, or a combination thereof.

21. An apparatus for wireless communications, comprising:
a memory; and
at least one processor coupled to the memory, the at least one processor being configured:
to determine at least one potential gap pattern configuration for a first radio access technology (RAT), the at least one potential gap pattern configuration satisfying a scheduling timeline constraint of the first RAT and a timeline constraint of a second RAT, each potential gap pattern comprising a subframe for a potential uplink grant and a subframe for hybrid automatic repeat request (HARQ) feedback to satisfy the scheduling timeline constraint of the first RAT;
to select one of the at least one potential gap pattern configuration that reduces conflicts between the first RAT and the second RAT; and
to transmit an indication of the selected gap pattern configuration to a base station, the indication intended for the base station to approve the selected gap pattern configuration and customize at least one HARQ process to correspond with the selected gap pattern configuration, the customizing comprises changing at least one of: uplink HARQ grant to transmission, transmission to acknowledgment (ACK), downlink HARQ grant to ACK, or a combination thereof.

22. The apparatus of claim 21 in which the scheduling timeline constraint comprises at least one of a grant scheduling and HARQ configuration.

23. The apparatus of claim 21 in which the at least one HARQ process is further customized based at least in part on at least one of a frame offset, a frequency division duplex configuration, and a time division duplex configuration, the customizing being based at least in part on increasing throughput of the first RAT on one of uplink communications, downlink communications, a function of uplink and downlink communications, or a combination thereof.

24. The apparatus of claim 21 in which the at least one processor is further configured to adjust operation of the second RAT based on the selected gap pattern configuration.

25. The apparatus of claim 21 in which the at least one processor is further configured to transmit, to the base station, at least one of an indication of a frame offset, an indication of a HARQ pattern configuration, an indication of a Bluetooth traffic type, or a combination thereof.

26. The apparatus of claim 21 in which the at least one processor is further configured to transmit, to the base station, at least one of a coexistence indication, a Bluetooth operation mode, a RAT timing offset, a desired gap pattern configuration, or a combination thereof.

27. The apparatus of claim 21 in which the at least one processor is further configured to select based at least in part on reducing overlap between multiple user equipments.

28. The apparatus of claim 21 in which the selected gap pattern configuration is different from a desired gap pattern configuration.

29. The apparatus of claim 21 in which the base station configures communication resources to implement the selected gap pattern configuration.

30. The apparatus of claim 29 in which the communication resources comprise at least one of a scheduling request (SR), sounding reference signal (SRS), physical random access channel (PRACH), and channel quality index (CQI).

31. The apparatus of claim 21 in which the at least one processor is further configured to configure a frame offset between communications of the first RAT and the second RAT, in which the at least one potential gap pattern configuration is based at least in part on the determined frame offset.

32. The apparatus of claim 21 in which the at least one processor is further configured to implement the selected gap pattern configuration with discontinuous reception (DRX).

33. The apparatus of claim 21 in which the at least one processor is further configured to select based at least in part on a Bluetooth error performance meeting a threshold.

34. The apparatus of claim 21 in which the at least one processor is further configured to select based at least in part on a desired performance of the first RAT.

35. The apparatus of claim 21 in which the at least one processor is further configured to select based at least in part on a desired performance of the second RAT.

36. The apparatus of claim 21 in which the at least one processor is further configured to select based at least in part on reducing degradation to a subframe containing desired control signals.

37. The apparatus of claim 21 in which the at least one processor is further configured to adjust communication activity based at least in part on undesired subframes in the selected gap pattern configuration.

38. The apparatus of claim 21, in which the at least one processor is further configured to assign a weight metric to each potential gap pattern configuration, the weight metric calculated based on a function of a downlink subframe and an uplink subframe used in each potential gap pattern configuration.

* * * * *